US011363467B2

(12) United States Patent
Simon et al.

(10) Patent No.: US 11,363,467 B2
(45) Date of Patent: Jun. 14, 2022

(54) ENABLING EFFICIENT DETERMINISTIC VIRTUALIZED BROADCAST SPECTRUM SHARING AND USAGE VALIDATION

(71) Applicant: Sinclair Broadcast Group, Inc., Hunt Valley, MD (US)

(72) Inventors: Michael John Simon, Frederick, MD (US); Mark A. Aitken, Parkton, MD (US); Ebenezer K. Kofi, Hunt Valley, MD (US); Louis Herbert Libin, Woodmere, NY (US)

(73) Assignee: SINCLAIR BROADCAST GROUP, INC., Hunt Valley, MD (US)

( * ) Notice: Subject to any disclaimer, the term of this patent is extended or adjusted under 35 U.S.C. 154(b) by 217 days.

(21) Appl. No.: 16/808,996

(22) Filed: Mar. 4, 2020

(65) Prior Publication Data
US 2020/0288325 A1    Sep. 10, 2020

Related U.S. Application Data

(60) Provisional application No. 62/813,564, filed on Mar. 4, 2019.

(51) Int. Cl.
*H04W 16/14* (2009.01)
*H04L 5/00* (2006.01)
(Continued)

(52) U.S. Cl.
CPC ........... *H04W 16/14* (2013.01); *H04L 5/0007* (2013.01); *H04L 12/189* (2013.01);
(Continued)

(58) Field of Classification Search
CPC . H04W 16/14; H04W 72/0406; H04W 76/40; H04W 48/12; H04L 5/0007;
(Continued)

(56) References Cited

U.S. PATENT DOCUMENTS 9,843,845 B2   12/2017 Aitken et al.
10,652,624 B2   5/2020 Simon et al.
(Continued)

FOREIGN PATENT DOCUMENTS

WO    WO-2019/165463 A1    8/2019

OTHER PUBLICATIONS

Search Report and Written Opinion, dated Jun. 26, 2020, for International Patent Appl. No. PCT/US2020/020981, filed Mar. 4, 2020, 16 pages.
(Continued)

*Primary Examiner* — Vinncelas Louis
(74) *Attorney, Agent, or Firm* — Sterne, Kessler, Goldstein & Fox P.L.L.C.

(57) ABSTRACT

Disclosed herein are methods, an apparatus, and a computer-readable medium product for sharing broadcast resources and validating usage of the broadcast resources according to an agreement between a plurality of broadcast virtual network operators (BVNOs). A method includes determining the plurality of spectrum resources corresponding to a length of a broadcast frame, and creating a plurality of physical layer pipes (PLPs) based on a plurality of internet protocol (IP) flows from the plurality of BVNOs. The method includes constructing the broadcast frame including the plurality of PLPs and generating a broadcast frame record based on transmission of the broadcast frame. The broadcast frame record can identify the plurality of spectrum resources shared between the plurality of BVNOs. The method includes updating the broadcast frame record with identification information of the plurality of BVNOs and the plurality of IP flows corresponding to the plurality of PLPs of the broadcast frame.

20 Claims, 27 Drawing Sheets

(51) Int. Cl.
  *H04L 12/18* (2006.01)
  *H04N 21/6332* (2011.01)
  *H04N 21/643* (2011.01)
  *H04W 72/04* (2009.01)
(52) U.S. Cl.
  CPC ... *H04N 21/6332* (2013.01); *H04N 21/64322* (2013.01); *H04W 72/0406* (2013.01)
(58) Field of Classification Search
  CPC . H04L 12/189; H04L 1/1678; H04N 21/6332; H04N 21/64322
  See application file for complete search history.

(56) References Cited

U.S. PATENT DOCUMENTS

| | | | |
|---|---|---|---|
| 2014/0140014 A1 | 5/2014 | Huang et al. | |
| 2015/0085735 A1* | 3/2015 | Shelby | H04L 1/1678 370/312 |
| 2016/0057504 A1 | 2/2016 | Shelby et al. | |
| 2017/0295409 A1 | 10/2017 | Simon et al. | |
| 2018/0317055 A1 | 11/2018 | Shelby et al. | |
| 2019/0268777 A1 | 8/2019 | Simon et al. | |
| 2020/0178121 A1 | 6/2020 | Simon et al. | |

OTHER PUBLICATIONS

"ATSC Standard: Scheduler / Studio to Transmitter Link," Doc. A/324:2018, Jan. 5, 2018, 83 pages (i-vi and 1-77).

"Neutral Host Solutions for 5G Multi-Operator Deployments in Managed Spaces," Alliance for Telecommunications Industry Solutions, 2019, 49 pages.

"ATSC Standard: A/321, System Discovery and Signaling," Advanced Television Systems Committee, Doc. A/321:2016, Mar. 23, 2016, 28 pages.

"ATSC Standard: Physical Layer Protocol (A/322)," Advanced Television Systems Committee, Doc. A/322:2018, Dec. 26, 2018, 263 pages.

* cited by examiner

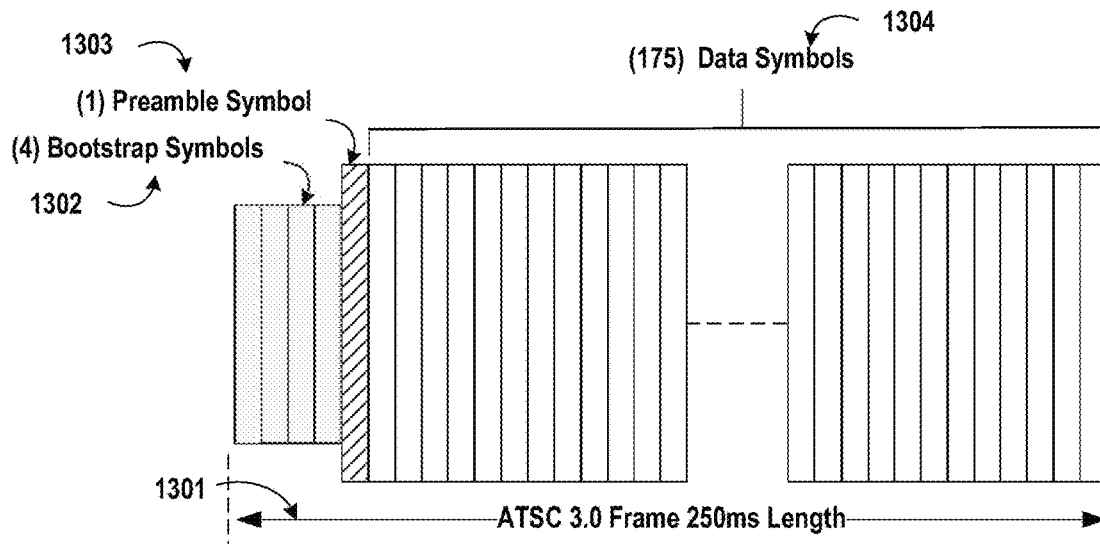

1339 Total Samples (T) frame = 6,912 samples(T) / ms x 250ms = 1,728,000 Samples (T)

1341 (4) Bootstrap Samples (T) = 13,824 Samples (T)
1340 (1) Preamble Symbols = 8192 (T) + 1536 (T) = 9,728 Samples (T)
1342 (175) Data Symbols = 175 x [ 8192 (T) + 1536 (T) + 11 (T)] + 123 (T) = 1,704,448 Samples (T)

1343 Check Total Samples (T): 13,824 (T) + 9728 (T) + 1,704,448 (T) = 1,728,000 Samples (T)

1344 Overhead Time domain = 13,824 (T) + 1536 (T) + 175 x [ 1536 T + 11 T] + 123 (T) = 286,208 (T)

1345 176 Symbols analyzed Frequency Domain = 8192 (T) + [175 x 8192 (T)] = 1,441,792 (T)
1346 Available data cells (1) Preamble = table 7.3 4851 Samples (T) - [ 934 (L1 basic table 6.17) + 1868 (1320)] = 2049 (T) avail data cells
1347 (175) Data Symbols table 7.2 = 175 x 6287 = 1,100,225 (T) avail data Cells

1348 Total avail data cells Frame = 2049 Cells + 1,100,225 Cells = 1,102,274 Cells

1349 Total Overhead Freq Domain = 1,441,792 (T) − 1,102,274 (T) = 339,518 (T)

| Timing & Management Syntax | # Bits | Example (Decimal) | | |
|---|---|---|---|---|
| Structure_Data () { | | | | |
|   bootstrap_major | 4 | 0 | ← ATSC 3.0 Frame Type | 1306 |
|   bootstrap_minor | 4 | 0 | ← 6MHz BW | 1307 |
|   system_bandwidth | 2 | 0 | ← N: Fs =[N+16] x 384,000 | 1308 |
|   bsr_coefficient | 7 | 2 | ← Table H.1.1 | 1309 |
|   preamble_structure | 8 | 26 | | |
| } | | | Bootstrap Emission Time (TAI) | |
| Bootstrap_Timing_Data () | | | | |
|   for (i=0; i<=num_emission_tim; i++) | | | | |
|     seconds | 32 | XXXX | ← seconds | 1310 |
|     nanoseconds | 32 | XXXX | ← nanoseconds | 1311 |

1305

1312

| L1 Basic | # Bits | Example (Decimal) | | |
|---|---|---|---|---|
| L1B_frame_length_mode | 1 | 0 | ← Time Aligned Frame | 1313 |
| if ( L1B_frame_length_mode=0 ) { | | | | |
|   L1B_frame_length | 10 | 50 | ← 50 x 5ms = 250ms | 1314 |
|   L1B_excess_samples_per_symbol | 13 | 11 | ← Excess Samples | 1315 |
| } | | | | |
| L1B_num_subframes | 8 | 0 | ← 1 subframe | 1316 |
| L1B_preamble_num_symbols | 3 | 0 | ← 1 preamble symbol | 1317 |
| L1B_preamble_reduced_carriers | 3 | 4 | ← 4851 (table 7.2) | 1318 |
| L1B_L1_Detail_fec_type | 3 | 1 | ← mode 2 (table 6.17) | 1319 |
| L1B_L1_Detail_total_cells | 19 | 1868 | ← available data cells | 1320 |

| L1 Detail | # Bits | Example (Decimal) | | |
|---|---|---|---|---|
| for (i=0 .. L1B_num_subframes) { | | | | |
|   if (i > 0) { | | | | |
|   L1D_fft_size | 2 | 0 ◄— 8192 IFFT (table 8.8) | | 1322 |
|   L1D_reduced_carriers | 3 | 0 ◄— NoC = 6913 (table 7.3) | | 1323 |
|   L1D_guard_interval | 4 | 6 ◄— CP = 1536 (T) table 8.9 | | 1324 |
|   L1D_num_ofdm_symbols | 11 | 175 ◄— 175 data symbols | | 1325 |
|   L1D_scattered_pilot_pattern | 5 | 6 ◄— SP6_2 (table 7.3) | | 1326 |
|   L1D_plp_type | 1 | 0 ◄— non-dispersed PLP | | 1327 |
|   L1D_num_plp | 6 | 3 ◄— 4 PLP | | 1328 |

| | | 1329 | 1330 | 1331 | 1332 |
|---|---|---|---|---|---|
| for (j=0 .. L1D_num_plp) { | | (PLP 0) | (PLP 1) | (PLP 2) | (PLP 3) |
| 1333 → L1D _plp_id | 6 | 0 | 1 | 2 | 3 |
| 1334 → L1D _plp_start | 24 | 0 | 8335 | 372,981 | 773,627 |
| 1335 → L1D _plp_size | 24 | 8336 | 364,646 | 364,646 | 364,646 |
| 1336 → L1D _plp_fec_type | 4 | 5 | 5 | 5 | 5 |
| 1337 → L1D _plp_mod | 4 | 1 | 1 | 2 | 3 |
| 1338 → L1D _plp_cod | 4 | 3 | 3 | 4 | 7 |

1350   Avail Data Cells: PLP 0 = 8336; + PLP 1= 364,646 + PLP 2= 364,646 + PLP 3= 364,646 = 1,102,274

1351   PLP 0 capacity bps = 5/15 x 4 x 8336 = 11,115 bits / 250ms x 4 = 44,460 bps
1352   PLP 1 capacity bps = 5/15 x 4 x 364,646 = 486,195 bits/250ms x 4 = 1,944,780 bps
1353   PLP 1 capacity bps = 6/15 x 6 x 364,646 = 875,150 bits /250ms x 4 = 3,500,600 bps
1354   PLP 1 capacity bps = 9/15 x 8 x 364,646 = 1,750,300 bits /250ms x 4 = 7,001,200 bps

| Parameter | | 8K FFT | 16K FFT | 32K FFT |
|---|---|---|---|---|
| Number of carriers NoC | $C_{red\_coeff} = 0$ | 6913 | 13825 | 27649 |
| | $C_{red\_coeff} = 1$ | 6817 | 13633 | 27265 |
| | $C_{red\_coeff} = 2$ | 6721 | 13441 | 26881 |
| | $C_{red\_coeff} = 3$ | 6625 | 13249 | 26497 |
| | $C_{red\_coeff} = 4$ | 6529 | 13057 | 26113 |
| Duration $T_U$ | | 8192 T | 16384 T | 32768 T |
| Carrier spacing ΔF (Hz) | | 843.75 | 421.875 | 210.9375 |

1401 A/322 Table 8.8 OFDM Numerology

| Signaling FEC Type | | $K_{sig}$ | Code Length | Code Rate | Constellation | Length (Cells) |
|---|---|---|---|---|---|---|
| L1-Basic | Mode 1 | 200 | 16200 | 3/15 (Type A) | QPSK | 3820 |
| | Mode 2 | | | | QPSK | 934 |
| | Mode 3 | | | | QPSK | 484 |
| | Mode 4 | | | | NUC_16_8/15 | 259 |
| | Mode 5 | | | | NUC_64_9/15 | 163 |
| | Mode 6 | | | | NUC_256_9/15 | 112 |
| | Mode 7 | | | | NUC_256_13/15 | 69 |
| L1-Detail | Mode 1 | 200 ~ 2352 | | 6/15 (Type B) | QPSK | |
| | Mode 2 | 200 ~ 3072 | | | QPSK | |
| | Mode 3 | 200 ~ 6312 | | | QPSK | |
| | Mode 4 | | | | NUC_16_8/15 | |
| | Mode 5 | | | | NUC_64_9/15 | |
| | Mode 6 | | | | NUC_256_9/15 | |
| | Mode 7 | | | | NUC_256_13/15 | |

A/322 Table 6.17 Configuration L1 Basic and L1 Signal

| pre_structure | FFT Size | GI Length (samples) | Preamble Pilot $D_x$ | L1-Basic FEC Mode |
|---|---|---|---|---|
| 24 | 8K | 1024 | 3 | L1-Basic Mode 5 |
| 25 | 8K | 1536 | 4 | L1-Basic Mode 1 |
| 26 | 8K | 1536 | 4 | L1-Basic Mode 2 |
| 27 | 8K | 1536 | 4 | L1-Basic Mode 3 |
| 28 | 8K | 1536 | 4 | L1-Basic Mode 4 |

A/322 Table H.1.1 Preamble Structure Signaled in Bootstrap A/321

1403

| FFT Size | CP Length samples (T) | Pilot Pattern ($D_X$) | $C_{red\_coeff}$ | | | | |
|---|---|---|---|---|---|---|---|
| | | | 0 | 1 | 2 | 3 | 4 |
| 8K | 192 | 16 | 6432 | 6342 | 6253 | 6164 | 6075 |
| 8K | 384 | 8 | 6000 | 5916 | 5833 | 5750 | 5667 |
| 8K | 512 | 6 | 5712 | 5632 | 5553 | 5474 | 5395 |
| 8K | 768 | 4 | 5136 | 5064 | 4993 | 4922 | 4851 |
| 8K | 1024 | 3 | 4560 | 4496 | 4433 | 4370 | 4307 |
| 8K | 1536 | 4 | 5136 | 5064 | 4993 | 4922 | 4851 |
| 8K | 2048 | 3 | 4560 | 4496 | 4433 | 4370 | 4307 |

A/322 Table 7.2 Number Available Data Cells Preamble Symbol

| FFT Size | $C_{red\_coeff}$ | NoC | Available data cells per data symbol ||||||||
|---|---|---|---|---|---|---|---|---|---|---|
| | | | SP3_2 | SP3_4 | SP4_2 | SP4_4 | SP6_2 | SP6_4 | SP8_2 | SP8_4 |
| 8K | 0 | 6913 | 5711 | 6285 | 5999 | 6429 | 6287 | 6573 | 6431 | 6645 |
| | 1 | 6817 | 5631 | 6197 | 5915 | 6339 | 6199 | 6481 | 6341 | 6552 |
| | 2 | 6721 | 5552 | 6110 | 5832 | 6250 | 6112 | 6390 | 6252 | 6460 |
| | 3 | 6625 | 5473 | 6023 | 5749 | 6161 | 6025 | 6299 | 6163 | 6368 |
| | 4 | 6529 | 5394 | 5936 | 5666 | 6072 | 5938 | 6208 | 6074 | 6276 |

A/322 Table 7.3 Number of Available Data Cells per Data Symbol

1405

| CP | Samples (T) | 8K FFT | 16K FFT | 32K FFT |
|---|---|---|---|---|
| GI1_192 | 192 | ✓ | ✓ | ✓ |
| GI2_384 | 384 | ✓ | ✓ | ✓ |
| GI3_512 | 512 | ✓ | ✓ | ✓ |
| GI4_768 | 768 | ✓ | ✓ | ✓ |
| GI5_1024 | 1024 | ✓ | ✓ | ✓ |
| GI6_1536 | 1536 | ✓ | ✓ | ✓ |
| GI7_2048 | 2048 | ✓ | ✓ | ✓ |
| GI8_2432 | 2432 | N/A | ✓ | ✓ |
| GI9_3072 | 3072 | N/A | ✓ | ✓ |
| GI10_3648 | 3648 | N/A | ✓ | ✓ |
| GI11_4096 | 4096 | N/A | ✓ | ✓ |
| GI12_4864 | 4864 | N/A | N/A | ✓ |

A/322 Table 8.9 Duration of the Guard Intervals in Samples

| | | | 2/15 | 3/15 | 4/15 | 5/15 | 6/15 | 7/15 | 8/15 | 9/15 | 10/15 | 11/15 | 12/15 | 13/15 |
|---|---|---|---|---|---|---|---|---|---|---|---|---|---|---|
| QPSK | 64K LDPC | Simulation | -6.05 | -4.18 | -2.79 | -1.59 | -0.38 | 0.42 | 1.32 | 2.11 | 2.92 | 3.72 | 4.61 | 5.61 |
| | | Lab test | -4.01 | -3.10 | -2.00 | -1.00 | 0.50 | 0.90 | 2.00 | 2.80 | 3.70 | 4.20 | 5.10 | 6.00 |
| | | Field test | -3.88 | -2.94 | -1.86 | -0.73 | 0.68 | 1.10 | 2.18 | 2.94 | 3.85 | 4.43 | 5.26 | 6.19 |
| | 16K LDPC | Simulation | -5.49 | -3.68 | -2.29 | -1.18 | -0.19 | 0.62 | 1.51 | 2.31 | 3.12 | 3.91 | 4.82 | 5.82 |
| | | Lab test | -4.23 | -2.80 | -1.60 | -0.70 | 0.70 | 1.40 | 2.10 | 2.80 | 3.70 | 4.20 | 5.10 | 6.10 |
| | | Field test | -4.07 | -2.67 | -1.46 | -0.52 | 0.91 | 1.63 | 2.32 | 2.89 | 3.92 | 4.47 | 5.27 | 6.32 |
| 16 QAM | 64K LDPC | Simulation | -2.58 | -0.09 | 1.61 | 2.92 | 4.41 | 5.41 | 6.52 | 7.52 | 8.52 | 9.61 | 10.71 | 11.91 |
| | | Lab test | -1.80 | 0.70 | 2.10 | 3.60 | 5.50 | 5.90 | 7.20 | 8.30 | 9.20 | 10.10 | 11.10 | 12.30 |
| | | Field test | -1.59 | 0.93 | 2.41 | 3.72 | 5.67 | 6.13 | 7.35 | 8.47 | 9.42 | 10.46 | 11.45 | 12.58 |
| | 16K LDPC | Simulation | -2.09 | 0.41 | 2.02 | 3.32 | 4.62 | 5.71 | 6.61 | 7.71 | 8.71 | 9.81 | 10.92 | 12.22 |
| | | Lab test | -1.40 | 1.00 | 2.60 | 3.80 | 5.50 | 6.30 | 7.40 | 8.30 | 9.40 | 10.20 | 11.30 | 12.50 |
| | | Field test | -1.28 | 1.22 | 2.92 | 3.93 | 5.77 | 6.49 | 7.57 | 8.64 | 9.56 | 10.45 | 11.76 | 12.76 |
| 64 QAM | 64K LDPC | Simulation | -0.18 | 2.41 | 4.33 | 6.12 | 7.82 | 9.11 | 10.52 | 11.71 | 13.01 | 14.41 | 15.72 | 17.32 |
| | | Lab test | 0.50 | 3.00 | 4.90 | 6.50 | 8.90 | 9.50 | 11.30 | 12.60 | 13.80 | 15.00 | 16.30 | 17.60 |
| | | Field test | 0.65 | 3.16 | 5.24 | 6.85 | 9.18 | 9.59 | 11.42 | 12.82 | 13.94 | 15.16 | 16.59 | 17.69 |
| | 16K LDPC | Simulation | 0.41 | 2.81 | 4.71 | 6.81 | 8.11 | 9.52 | 10.72 | 12.01 | 13.22 | 14.71 | 16.02 | 17.42 |
| | | Lab test | 0.90 | 3.50 | 5.30 | 6.90 | 9.10 | 10.40 | 11.70 | 12.70 | 14.00 | 15.10 | 16.40 | 17.90 |
| | | Field test | 1.15 | 3.71 | 5.54 | 7.11 | 9.30 | 10.56 | 11.93 | 12.86 | 14.23 | 15.46 | 16.54 | 18.07 |
| 256 QAM | 64K LDPC | Simulation | 1.71 | 4.42 | 6.72 | 8.72 | 10.91 | 12.21 | 14.11 | 15.71 | 17.32 | 18.91 | 20.61 | 22.42 |
| | | Lab test | 2.30 | 4.80 | 7.20 | 9.10 | 11.70 | 12.70 | 14.90 | 16.50 | 18.30 | 19.70 | 21.30 | 23.00 |
| | | Field test | 2.45 | 4.98 | 7.33 | 9.32 | 11.84 | 12.91 | 15.01 | 16.83 | 18.50 | 19.90 | 21.59 | 23.40 |
| | 16K LDPC | Simulation | 2.41 | 4.81 | 7.22 | 9.02 | 11.11 | 12.81 | 14.41 | 16.12 | 17.51 | 19.22 | 20.92 | 22.82 |
| | | Lab test | 2.70 | 5.30 | 7.80 | 9.50 | 11.80 | 13.80 | 15.40 | 16.60 | 18.40 | 19.80 | 21.50 | 23.30 |
| | | Field test | 2.92 | 5.59 | 8.07 | 9.80 | 12.11 | 14.09 | 15.58 | 16.80 | 18.50 | 19.95 | 21.69 | 23.43 |
| 1kQAM | 64K LDPC | Simulation | 3.42 | 6.32 | 8.91 | 11.22 | 13.81 | 15.41 | 17.71 | 19.71 | 21.61 | 23.61 | 25.71 | 27.81 |
| | | Lab test | 3.80 | 6.80 | 9.40 | 11.70 | 14.40 | 16.00 | 18.50 | 20.60 | 22.50 | 25.26 | 26.44 | 28.39 |
| | | Field test | 4.10 | 7.16 | 9.66 | 11.90 | 14.55 | 16.36 | 18.66 | 20.78 | 22.81 | 25.21 | 26.65 | 28.53 |
| 4kQAM | 64K LDPC | Simulation | 4.72 | 8.01 | 10.82 | 13.62 | 16.31 | 18.31 | 20.92 | 23.32 | 25.82 | 28.11 | 30.51 | 33.12 |
| | | Lab test | 5.20 | 8.50 | 11.50 | 14.10 | 17.00 | 19.10 | 21.70 | 23.96 | 26.49 | 28.70 | 30.79 | 33.12 |
| | | Field test | 5.45 | 8.85 | 11.86 | 14.21 | 17.14 | 19.28 | 22.12 | 24.22 | 26.68 | 28.91 | 31.51 | 34.04 |

FIG. 17

ENABLING EFFICIENT DETERMINISTIC VIRTUALIZED BROADCAST SPECTRUM SHARING AND USAGE VALIDATION

CROSS-REFERENCE TO RELATED APPLICATIONS

This application claims priority under 35 U.S.C. § 119(e) to U.S. Provisional Patent Application No. 62/813,564 titled "An Efficient Broadcast Spectrum Virtualization and Channel Sharing" and filed on Mar. 4, 2019, which is herein incorporated by reference in its entirety for all purposes. This application is related to U.S. patent application Ser. No. 15/480,981 titled "Next Generation Terrestrial Broadcast Platform Aligned Internet and Towards Emerging 5G Network Architectures," filed on Apr. 6, 2017; U.S. patent application Ser. No. 16/286,119 titled "A Next Generation Multi-Channel Tenant Virtualized Broadcast Platform and 5G Convergence," filed on Feb. 26, 2019; U.S. patent application Ser. No. 16/697,976 titled "ATSC 3.0 Physical Layer Extensions to Enable Mobility Broadcast 5G Convergence," filed on Nov. 27, 2019; and U.S. patent application Ser. No. 14/092,993 titled "Terrestrial Broadcast Market Exchange Network Platform and Broadcast Augmentation Channels for Hybrid Broadcasting in the Internet Age," filed on Nov. 28, 2013, and issued as U.S. Pat. No. 9,843,845 on Dec. 12, 2017, all of which are herein incorporated by reference in their entireties for all purposes.

BACKGROUND

In November 2017, the Federal Communications Commission (FCC) adopted the Advanced Television Systems Committee (ATSC) 3.0 (A/321, A/322) standards into its rules and permitted ATSC 3.0 for use on a voluntary basis by interested licensed broadcasters. Moreover, the FCC rules now permit licensed broadcasters to share a channel and transmission infrastructure voluntarily to innovate in a free market. The FCC also required that broadcasters continue broadcasting a primary channel using ATSC 1.0.

Given that ATSC 1.0 and ATSC 3.0 are not technically compatible for transmission in the same 6 MHz channel, the option to share broadcast channels to satisfy the requirement on ATSC 1.0 and voluntary use of ATSC 3.0 by broadcasters interested is a prudent way forward.

ATSC 3.0, which is based on IP layer transport, has the latest physical layer orthogonal frequency-division multiplexing (OFDM) technology. This allows interested broadcasters on a voluntary basis to use the same general concepts as the wireless industry to share 6 MHz channels virtually in a Spectrum Consortium of broadcasters in the USA. The Spectrum Consortium governance has an entity equivalent to a Neutral Host operator in the wireless industry. However, currently, there is a lack of a suitable framework that allows a form of channel sharing allowed by FCC on a voluntary basis and convergence with 5G with the emergence of a broadcast software-defined radio (SDR) chip into the market.

BRIEF SUMMARY

In one embodiment/aspect, a method is disclosed. The method includes determining a plurality of spectrum resources corresponding to a length of a broadcast frame. The method includes creating a plurality of physical layer pipes (PLPs) based on a plurality of internet protocol (IP) flows from a plurality of broadcast virtual network operators (BVNOs) and sending control information to construct the broadcast frame including the plurality of PLPs in which the plurality of spectrum resources being shared according to an agreement between the plurality of BVNOs. The method includes generating a broadcast frame record based on the transmission of the broadcast frame, wherein the broadcast frame record identifies the plurality of spectrum resources shared between the plurality of BVNOs. The method includes updating the broadcast frame record with identification information of the plurality of BVNOs, and the plurality of IP flows corresponding to the plurality of PLPs of the transmitted broadcast frame.

In another embodiment/aspect, an apparatus including a memory and a processor is disclosed. The processor is configured to perform operations stored in the memory. The operations include determining a plurality of spectrum resources corresponding to a length of a broadcast frame. The operations include creating a plurality of physical layer pipes (PLPs) based on a plurality of internet protocol (IP) flows from a plurality of broadcast virtual network operators (BVNOs) and sending control information to construct the broadcast frame including the plurality of PLPs in which the plurality of spectrum resources being shared according to an agreement between the plurality of BVNOs. The operations include generating a broadcast frame record based on the transmission of the broadcast frame, wherein the broadcast frame record identifies the plurality of spectrum resources shared between the plurality of BVNOs. The operations include updating the broadcast frame record with identification information of the plurality of BVNOs and the plurality of IP flows corresponding to the plurality of PLPs of the transmitted broadcast frame.

In yet another embodiment/aspect, computer-readable media (CRM), including computer instructions, is disclosed. Upon execution of the computer instructions by one or more processors of a communication device, cause the one or more processors to determine a plurality of spectrum resources corresponding to a length of a broadcast frame. The computer instructions further cause the one or more processors to create a plurality of physical layer pipes (PLPs) based on a plurality of internet protocol (IP) flows from a plurality of broadcast virtual network operators (BVNOs) and send control information to construct the broadcast frame including the plurality of PLPs in which the plurality of spectrum resources being shared according to an agreement between the plurality of BVNOs. The computer instructions further cause the one or more processors to generate a broadcast frame record based on the transmission of the broadcast frame, wherein the broadcast frame record identifies the plurality of spectrum resources shared between the plurality of BVNOs. The computer instructions further cause the one or more processors to update the broadcast frame record with identification information of the plurality of BVNOs and the plurality of IP flows corresponding to the plurality of PLPs of the transmitted broadcast frame.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. Elements shown as a single component can be replaced with multiple components, and elements shown as multiple components can be replaced with a single component. The drawings are not to scale, and the proportion of certain elements can be exaggerated for illustration.

FIGS. 13A-13C illustrate a detailed example of an ATSC 3.0 frame and analysis based on three BVNOs equally sharing broadcast spectrum resources of a 6 MHz channel, in accordance with some embodiments/aspects.

FIGS. 14A-14C illustrate the ATSC 3.0 A/322 standard tables used to analyze the spectrum resource usage of the example from FIGS. 13A-13C, in accordance with some embodiments/aspects.

FIG. 17 illustrates results simulation, lab, and field-testing of PLP configurations for ATSC 3.0 and C/N dB in additive white Gaussian noise (AWGN) and width PLP for the example from FIGS. 13A-13C, in accordance with some embodiments/aspects.

Figure 1:
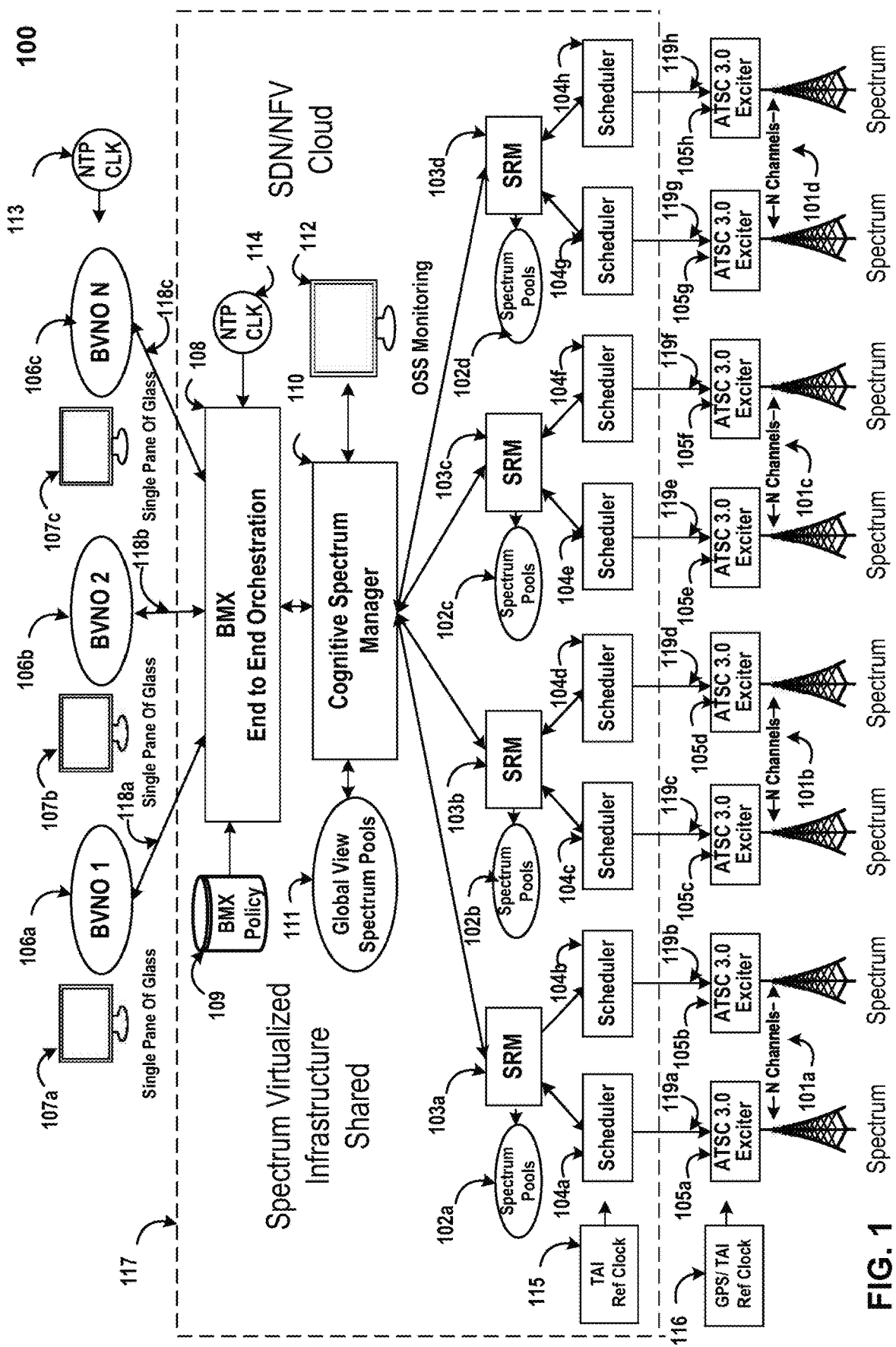
FIG. 1 illustrates a high-level view of multiple broadcast virtual network operators (BVNO) using shared spectrum resources, in accordance with some embodiments/aspects.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number

DETAILED DESCRIPTION

This disclosure is directed to broadcast spectrum virtualization and channel sharing among several broadcasters using ATSC 3.0 (Advanced Television Systems Committee) Standard. The ATSC 3.0 is a flexible and extensible standard, and the examples herein are based on channel assignments of 6 MHz. However, other channel bandwidths and waveforms beyond that described in ATSC 3.0 are possible using the methodology disclosed in this disclosure and in various cross-related applications described herein.

The ATSC 3.0 physical layer standard documents denoted by A/321 and A/322 were adopted into the FCC rules. The FCC also permitted broadcast innovation in a market-driven manner based on A/321 and A/322 standards.

In this disclosure, methods to enable efficient deterministic multi-user shared and validated usage of spectrum using ATSC 3.0 broadcast standard are described. Moreover, effective Mar. 5, 2018, the FCC authorized television broadcasters to use ATSC 3.0 (A/321, A/322) broadcast standards on a voluntary, market-driven basis in the United States. Adoption of the ATSC 3.0 standards permits several licensed broadcasters to share a 6 MHz licensed broadcast channel and transmission infrastructure, through private business agreements, to innovate using ATSC 3.0. However, as described above, the ATSC 3.0 broadcast standard lacks a method and the system architecture for efficient spectrum sharing. The method disclosed herein uses software-defined networking (SDN)/network function virtualization (NFV) cloud-native system architecture to place valuable low-band broadcast spectrum in use for new innovative wireless business models, including mobile services in the public interest.

In various embodiments/aspects, an efficient, flexible spectrum sharing method is disclosed based on ATSC 3.0 (A/321, A/322) broadcast standards. This method describes the sharing of the spectrum resource, which according to A/322, is defined as the "atomic unit" of measure used for flexible deterministic spectrum sharing and resource usage validation for multiple simultaneous users sharing spectrum. The method also describes validating sharing agreements among several broadcasters and the use of the broadcast spectrum for new innovative services in the public interest.

The broadcasters using this methodology are termed broadcast virtual network operators (BVNO) in this disclosure. Their spectrum resources may be shared under the control of cloud automation and network control, as discussed in detail below. Thus, the spectrum resources are commodities on a broadcast market exchange (BMX).

A broadcaster may choose to use its spectrum resources for independent business models. Also, the broadcaster can have the option to sell and/or trade some of its spectrum resources to monetize on an automated open market-driven basis. This can create more valuable uses for the broadcast spectrum using BMX that is driven by selected policy.

The BMX policy running in the cloud enables new innovative use cases of the broadcast spectrum, including mobile broadcast 5G convergence. The FCC rules do not mandate ATSC 3.0 use for television service but permit broadcasters to innovate voluntarily with their broadcast spectrum, including mobile services using market-driven principles. This disclosure is aligned with such market-driven principles to enable efficient, flexible spectrum sharing and usage validation.

According to some aspects, an "atomic unit" of measure is defined that enables deterministic spectrum sharing and resource usage validation for multiple simultaneous users of the shared spectrum. Through study and simulation, the atomic unit of measure chosen is Sample (T) defined in A/322. As described herein, the total number of Sample (T) units can be defined by $Fs=(N+16) \times 384,000$, where Fs represents a total number of samples (T) per second and in a 6 MHz bandwidth then N=2 is used as used for examples in USA in this discloser or other bandwidths indicated by different values of N and is used in optimized spectrum sharing method according to various embodiments/aspects.

The number of Sample (T) units' usage per second remains a constant independent of how the ATSC 3.0 frames broadcast are configured or the number of users sharing spectrum. The Fs frequency is derived from International Atomic Time (TAI) reference clock, such that a stable deterministic system behavior for virtualized sharing of spectrum and usage validation can be achieved.

The sharing method is disclosed by examples using analysis of Sample (T) units used in each ATSC 3.0 frame broadcast in the spectrum shared by several users. The value of automating this functionality in the SDN/NFV cloud environment and resulting efficiency and flexibility created is also discussed. Several examples are given for those skilled in the art to appreciate some of the uses of the spectrum that become possible.

FIG. 1 illustrates a high-level view of a plurality of broadcast virtual network operators (BVNOs) using shared spectrum resources, in accordance with some embodiments/aspects. The plurality of BVNOs can share the spectrum resources using software-defined networking (SDN) and network function virtualization (NFV) based cloud system. In particular, various embodiments/aspects are described based on a 6 MHz channel being shared by the plurality of BVNOs using national transmission infrastructure. In different examples, sharing a plurality of 6 MHz channels covering different regions of a country is also described. The system 100 in FIG. 1 is a high-level logical view showing several broadcast virtual network operators BVNO 106a, 106b, 106c (collectively referred to as BVNO 106) using the shared spectrum resources managed in SDN/NFV cloud platform 117. Each BVNO 106 is authenticated and authorized to send data content into the cloud via the northbound interface, for example, 118a, 118b, and 118c, under control of BMX end to end orchestration entity 108 using synchronized access via Network Time Protocol (NTP) clock 113 and 114. Each BVNO, for example, 106a, 106b, and 106c, controls and monitors their virtualized isolated cloud operation on their own premise using a single pane of glass 107a, 107b, 107c as shown in FIG. 1.

According to some embodiments/aspects, the N channels of broadcast spectrum 101a, 101b, 101c, and 101d constitute the next generation wireless platform (NGWP). Each 6 MHz channel spectrum resources are represented in a spectrum pool 102a, 102b, 102c, and 102d managed by a plurality of spectrum resource manager (SRM) entities 103a, 103b, 103c, and 103d.

In accordance with some embodiments/aspects, each SRM can independently manage each spectrum pool for each assigned 6 MHz channel and ATSC 3.0 scheduler 104a, 104b, 104c, 104d, 104d, 104e, 104g, 104h that schedules the building of ATSC 3.0 frames. The ATSC 3.0 scheduled frames are then sent using southbound interface, for example, 119a through 119h (collectively referred to as southbound interface 119), to assigned ATSC 3.0 exciter, for example, 105a through 105h (collectively referred to as ATSC 3.0 exciter 105), respectively. The ATSC 3.0 exciter 105 uses the preprocessed data and L1 signaling and timing information from assigned ATSC 3.0 scheduler and constructs an ATSC 3.0 frame. Then the ATSC 3.0 exciter 105 converts the ATSC 3.0 frame into a radio signal for emission in broadcast spectrum. The emission timing is controlled using TAI reference clock 115 for ATSC 3.0 schedulers and GPS/TAI reference clock for ATSC 3.0 exciters 105.

According to some embodiments/aspects, the end-to-end system 100 operates in synchronous fashion with NTP clock 113 to the plurality of BVNOs 106a, 106b, and 106c, and NTP clock 114 to the BMX end-to-end orchestration 108 for content ingress into the cloud. The physical layer frames emission time is based on TAI clock 115, 116. By way of a non-limiting example, TAI clock 115 or 116 may be a global positioning system (GPS) based clock. The TAI clock 116 provides synchronization time to ATSC 3.0 exciters 105a through 105h. According to some embodiments/aspects, the broadcast spectrum resource usage with a methodology disclosed herein results in a constant sample (T) rate of usage per unit of time. Also, this constant sample (T) usage is independent of how the ATSC 3.0 frame is configured or is independent of the number of users sharing resources from the spectrum pool.

Therefore, according to some embodiments/aspects, the system 100, when viewed holistically, can provide maximum efficiency with multiple BVNOs sharing a constant sample (T) rate of spectrum resource usage in a 6 MHz channel. According to some embodiments/aspects, the time of access NTP clock 113, 114 into cloud and emission time (TAI/GPS) 115, 116 of each ATSC 3.0 frame for each second are known in advance and are orchestrated by the BMX end-to-end orchestration entity 108 using appropriate timestamps. This brings efficiency and flexibility using a common system cadence for access based on NTP, and this aligns with automation and options of trading or selling spectrum resources with the BMX.

Therefore, the BMX end to end orchestration entity 108 with globally available clocks at nodes may be used by the BVNOs 106a, 106b, and 106c to orchestrate access to the SDN/NFV cloud 117. Since the SRMs 103a, 103b, 103c, 103d are aware of the available spectrum resources in spectrum pools 102a, 102b, 102c, and 102d in real-time, the available spectrum resources may not be oversubscribed or undersubscribed by the SRMs 103*a*, 10*b*, 103*c*, and 103*d*. In some embodiments/aspects, efficiency can be further optimized using SRM cloud intelligence, as discussed below with reference to FIG. 17 with NTP available time at access nodes.

In some embodiments/aspects, the SRMs 103*a*, 103*b*, 103*c*, 103*d* each have a view of a number of channels directly controlled in a specific geographic region of license. The SRMs 103*a*, 103*b*, 103*c*, and 103*d* may have knowledge of ATSC 3.0 standards and OFDM physics for spectrum usage. By way of a non-limiting example, the SRM may be abstracted and agnostic to the business or policy used by physical layer OFDM resources.

In some embodiments/aspects, a cognitive spectrum manager (CSM) 110 may have a global view of spectrum pools 111, as shown in FIG. 1. The CSM 110 abstracts the details of the OFDM physical layer from BMX end-to-end orchestration entity 108, which provides the policy and business rules for monetizing the shared spectrum. The operation support system OSS 112 has a global view of the system. Whereas, BVNO system monitoring 107*a*, 107*b*, 107*c*, 107*d* has a filtered isolated view of the individual BVNO spectrum resources in the cloud.

Figure 2:
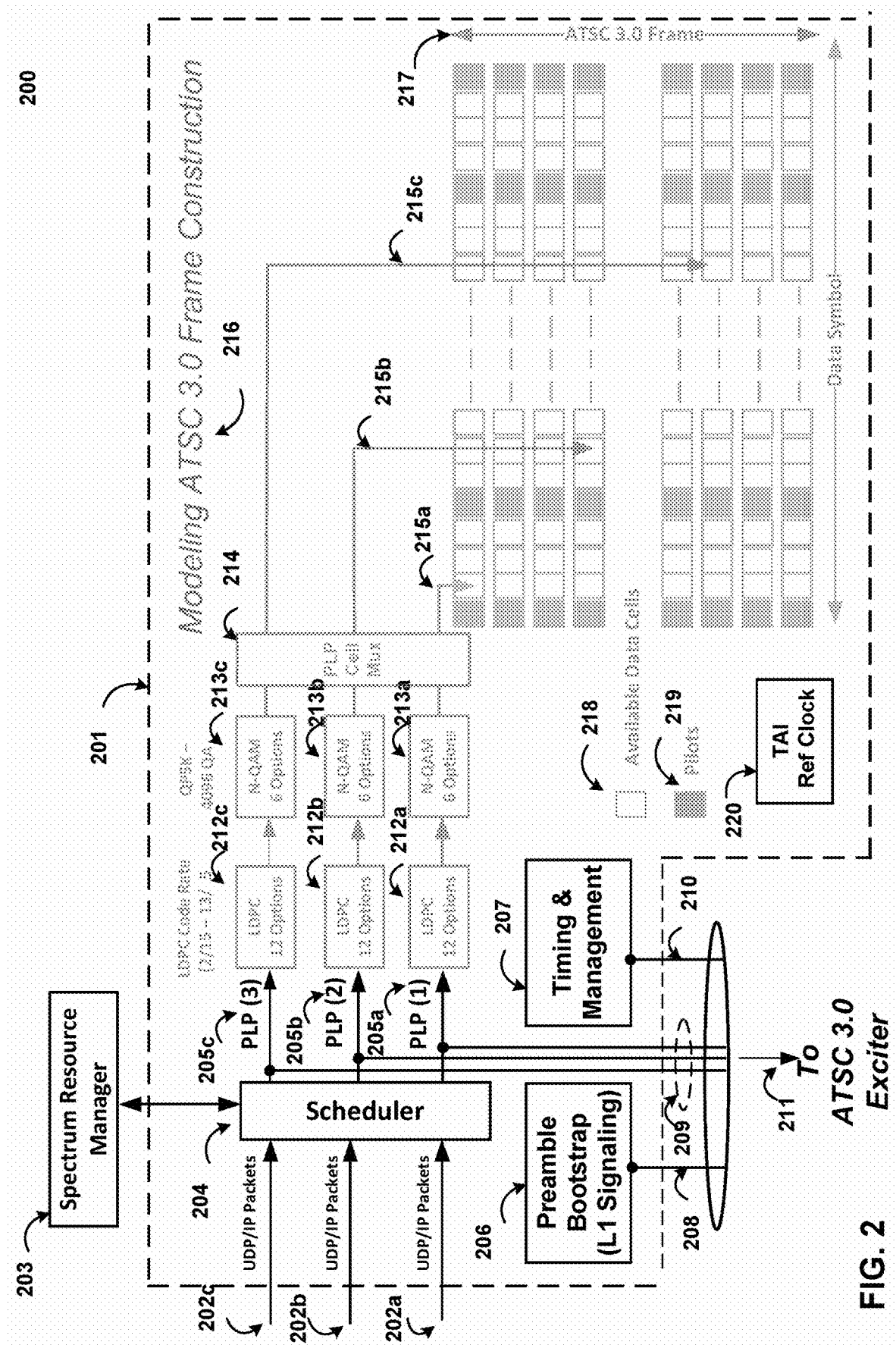
FIG. 2 illustrates details of a spectrum resource manager (SRM), in accordance with some embodiments/aspects.

FIG. 2 illustrates details of a spectrum resource manager (SRM), in accordance with some embodiments/aspects. The SRM, as shown in FIG. 1 as SRM 103*a*, 103*b*, 103*c*, and 103*d*, can control ATSC 3.0 scheduler block 204 that is responsible for constructing each ATSC 3.0 frame to the ATSC 3.0 exciter, for example, any of the ATSC 3.0 exciter 105*a* through 105*h*, at transmission site and then can broadcast using the spectrum, as shown in FIG. 1. A block diagram 200 in FIG. 2 shows relevant details of ATSC 3.0 gateway 201, which contains an ATSC 3.0 scheduler block 204 shown in FIG. 1 as ATSC 3.0 scheduler 104. The spectrum resource manager SRM entity 203 as an ATSC 3.0 agent may be responsible for the spectrum pool and may control physical layer pipe (PLP) configuration 205*a*, 205*b*, and 205*c* of the ATSC 3.0 scheduler block 204. By way of a non-limiting example, there may be one ATSC 3.0 scheduler block for each 6 MHz spectrum.

In some embodiments/aspects, multiple transmitter sites can be used in a single frequency network (SFN) using one 6 MHz channel. The SFN may require each SFN transmitter site to emit identical coherent signals. This can be achieved by a centrally located ATSC 3.0 gateway 201 and the ATSC 3.0 scheduler block 204 for decisions on building each ATSC 3.0 frame. The same recipe for how each frame can be built and then can be sent to ATSC 3.0 exciter 105 located at each SFN transmission site to enable coherent signals. By way of a non-limiting example, the ATSC 3.0 exciter 105 may represent one of N exciters using the SFN and the same channel.

In some embodiments/aspects, the ATSC 3.0 scheduler block 204 can accept IP packet inputs from different users, for example, three separate users 202*a*, 202*b*, 202*c*. The ATSC 3.0 scheduler block 204 with instructions received from the SRM 203 processes input IP packets to create three independent PLPs 205*a*, 205*b*, 205*c*. Each PLP is independent and has a selection of Low-Density Parity Check (LDPC) code rate 212*a*, 212*b*, 212*c*, and N-QAM modulation 213*a*, 213*b*, 213*c* into resulting PLP data cells. The PLP data cells are multiplexed by a PLP cell multiplexor 214 into symbols of an ATSC 3.0 frame 217. By way of a non-limiting example, the PLP data cells can be mapped into available data cells 218 of the OFDM symbols 215*a*, 215*b*, and 215*c*. Each OFDM symbol can also contain other cells used for other purposes, such as pilot signals 219, etc.

In some embodiments/aspects, the ATSC 3.0 scheduler block 204 models the ATSC 3.0 frame construction 216 and then sends resulting preprocessed PLP data 209, L1 signaling 206 and timing and management signaling 207 to an ATSC 3.0 exciter, as shown in FIG. 2 as 211. The L1 signaling 206, and the timing and management signaling 207 describe how the PLP data 209 is used by the ATSC 3.0 exciter to build the ATSC 3.0 frame 217.

Accordingly, this can result in SFN coherent signals irrespective of whether there is one or N ATSC 3.0 exciters when using SFN (where N is an integer greater than or equal to one).

In some embodiments/aspects, a TAI reference clock 220 can be used by the ATSC 3.0 scheduler block 204 to create TAI timestamps sent in the timing and management signaling 210 to the ATSC 3.0 exciter. The TAI timestamp information can enable the ATSC 3.0 frame 217 to be built by the ATSC 3.0 exciter and then emitted at a transmitter antenna into the spectrum at the TAI time specified from the centrally located ATSC 3.0 gateway 201. The deterministic ATSC 3.0 frame emission time is used in the efficient orchestration of broadcast spectrum sharing to be disclosed.

Figure 3:
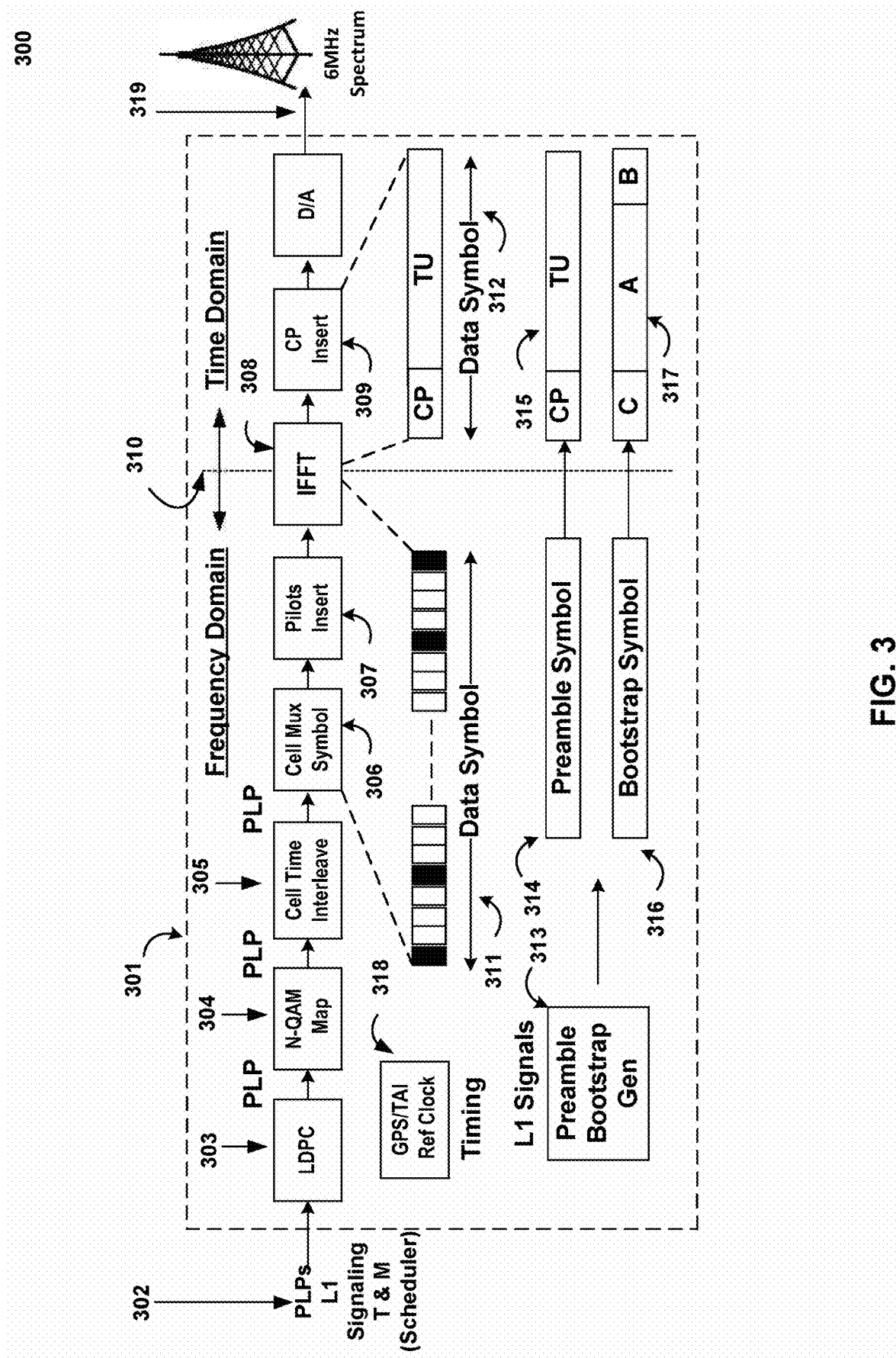
FIG. 3 illustrates details of an ATSC 3.0 exciter, in accordance with some embodiments/aspects.

FIG. 3 illustrates details of an ATSC 3.0 exciter, in accordance with some embodiments/aspects. A block diagram 300 in FIG. 3 shows an ATSC 3.0 exciter 301 and relevant blocks of the ATSC 3.0 exciter 301. The ATSC 3.0 exciter 301 can receive as input the output 211 from the ATSC 3.0 gateway, which is shown in FIG. 3 as 302. The input 302 to the ATSC 3.0 exciter 301 can include the preprocessed PLPs 209, L1 signaling 208, and Timing and Management signaling 210. Though a single PLP process chain 301 is shown, each individual PLP in 211 is processed by a separate processing chain that can include LDPC 303, N-QAM 304, Cell Time Interleave 305, Cell Mux 306, and Pilots Insert 307 to create a Data Symbol 311 in the frequency domain.

In some embodiments/aspects, the L1 signaling 218 can be used to generate a bootstrap symbol 316 in the frequency domain by a preamble bootstrap generator 313. The preamble bootstrap generator 313 can also be used to generate a Preamble symbol 314 in the frequency domain.

In some embodiments/aspects, a data symbol 311 can be provided as input to Inverse Fast Fourier Transform (IFFT) 308 that converts the data symbol 311 to the time domain and inserts cyclic prefix (CP) 309 to create a data symbol 312.

The preamble symbol 314 is converted using the IFFT 308, and the CP 309 added to create a preamble symbol 315. The bootstrap symbol 316 is likewise converted to a time-domain symbol 317.

The three types of OFDM symbols, the data 312, the preamble 315, and the bootstrap 317, are used in constructing each ATSC 3.0 frame. In other words, these three symbols are converted from digital to analog signals and emitted into spectrum 319 at the TAI time indicated by timestamp from the scheduler in the timing and management signaling 210 and used by a GPS/TAI reference clock 318 in the ATSC 3.0 exciter 301.

As described above, the atomic units of measure can be represented by $Fs=(N+16)\times 384{,}000$ Hz, where Fs defines the number of Samples (T) per second. The number of Samples (T) per second is a constant and is specified at the IFFT stage to convert symbols from the frequency to the time domain. The demarcation 310 between the frequency domain and the time domain is used in the analysis for the method used for spectrum sharing, which is discussed below.

Figure 4:
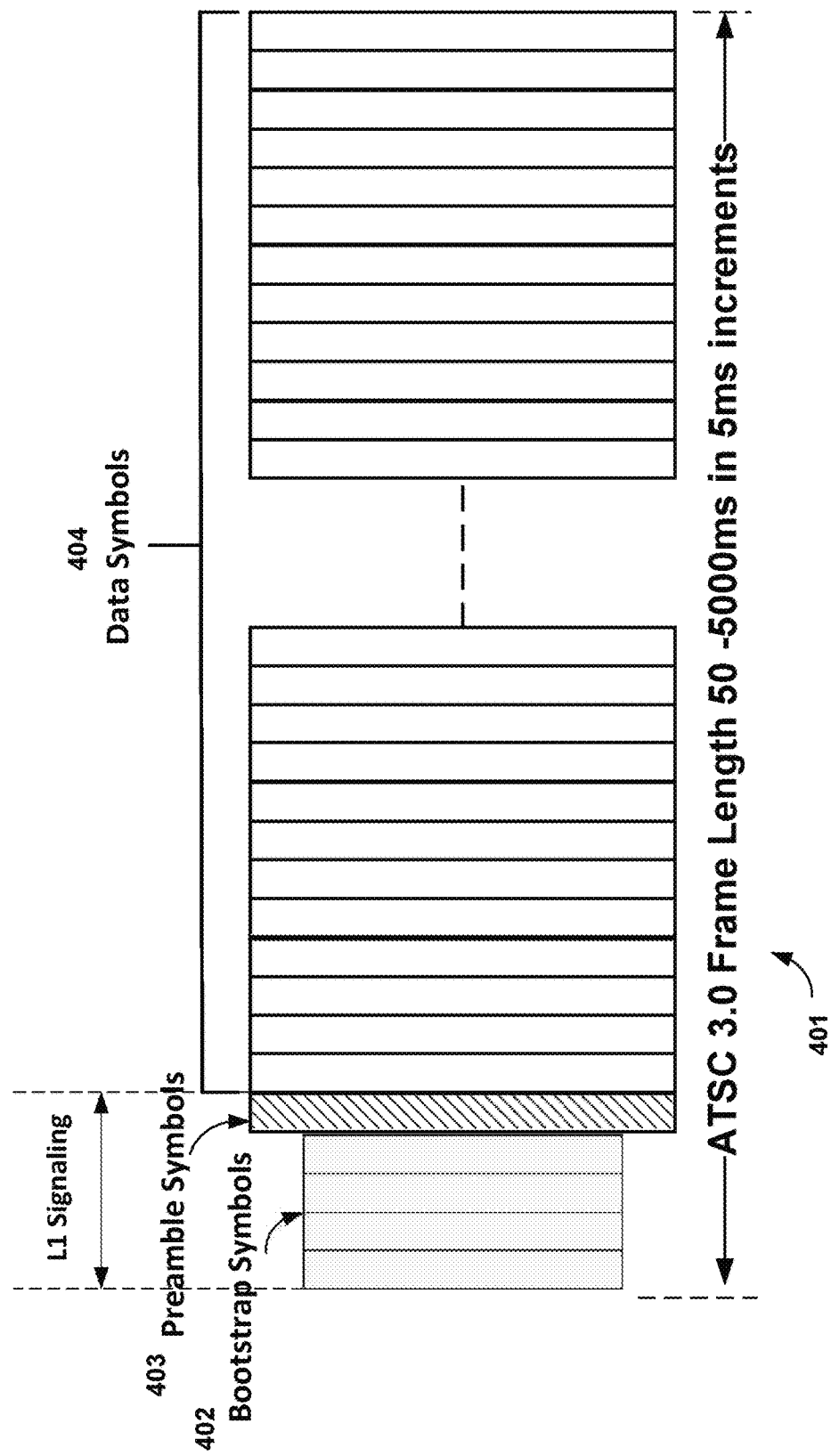
FIG. 4 illustrates one ATSC 3.0 frame, in accordance with some embodiments/aspects.

FIG. 4 illustrates one ATSC 3.0 frame, in accordance with some embodiments/aspects. A block 400 in FIG. 4 depicts an ATSC 3.0 frame 401 in the time domain. The ATSC 3.0 frame 401 can include three different types of OFDM symbols, and each type of the OFDM symbol may be analyzed for their spectrum resource usage in each frame. The ATSC 3.0 frame 401 may begin with four (4) bootstrap symbols 402 and one or more preamble symbols 403. The bootstrap symbols 401 and the one or more preamble symbols 403 together form the L1 signaling. The L1 signaling can be used by a receiver to initially synchronize to and recover essential low-level signaling to start the reception of IP data or content in data symbols 404 later in the ATSC 3.0 frame 401.

To summarize, ATSC 3.0 broadcasting is a continuous series of ATSC 3.0 frames like the ATSC 3.0 frame 401 in the time domain. Thus, each ATSC 3.0 frame can include three types of symbols, for example, bootstrap symbols 402, preamble symbols 403, and data symbols 404 as defined in ATSC A/321 and A/322 standards.

In some embodiments/aspects, the atomic units for N=2 for a 6 MHz channel according to ATSC 3.0 standard A/322 according to Fs=(N+16)×384,000 Hz results in Fs=6,912,000 Samples (T) per second or 6,912 Samples (T) per millisecond, and this is a constant for the 6 MHz channel using the ATSC 3.0 standard.

According, by way of a non-limiting example, if an ATSC 3.0 frame of 250 ms length is created, a total number of Samples (T) units required can be calculated as 250×6,912 Samples (T)/milliseconds=1,728,000 Samples (T) units. These Samples (T) units can be distributed between the three symbol types 402, 403, 404 in the ATSC 3.0 frame 401. The 6 MHz spectrum pool 102 represents the 6,912,000 Samples (T) resource units used each second (constant) to build continuous series of ATSC 3.0 frames in the time domain when broadcasting with the ATSC 3.0 standard.

Therefore, if an N (N being an integer greater than or equal to one) number of BVNOs agreed to share a 6 MHz channel using ATSC 3.0, the spectrum pool resources in units of Samples (T) are divided and shared by the N number of BVNOs according to the policy agreed in the sharing contract between the BVNOs. The 6,912,000 Samples (T) is constant and will be used each second independent of the number of PLPs or configuration used for frames.

In some embodiments/aspects, by way of a non-limiting example, the method for spectrum sharing is to virtualize spectrum in a pool managed by the SRM, for example, 103a, 103b, 103c, and/or 103d, that controls the scheduler, for example, 104a, 104b, 104c, 104d, 104e, 104f, 104g, and/or 104h, that constructs each ATSC 3.0 frame requested by the SRM. Each ATSC 3.0 frame includes, as described above, three OFDM symbol types. As described above, for an ATSC 3.0 frame of 250 ms length, the total number of Samples (T) units required is 1,728,000 Samples (T).

The 1,728,000 Samples (T) can be analyzed by the SRM using preamble and bootstrap signaling 208, timing and management signaling 210, and global system metadata to create a "broadcast frame record" for each frame broadcasted at a known TAI time. The ATSC 3.0 frame analysis can use the policy agreed between the BVNOs for sharing and is reflected in the broadcast frame record that determines the usage of Samples (T) by each BVNO sharing resources in the spectrum pool.

In the following paragraphs, an introduction of blocks used in the SDN/NDV cloud to create broadcast frame records is described.

Figure 5:
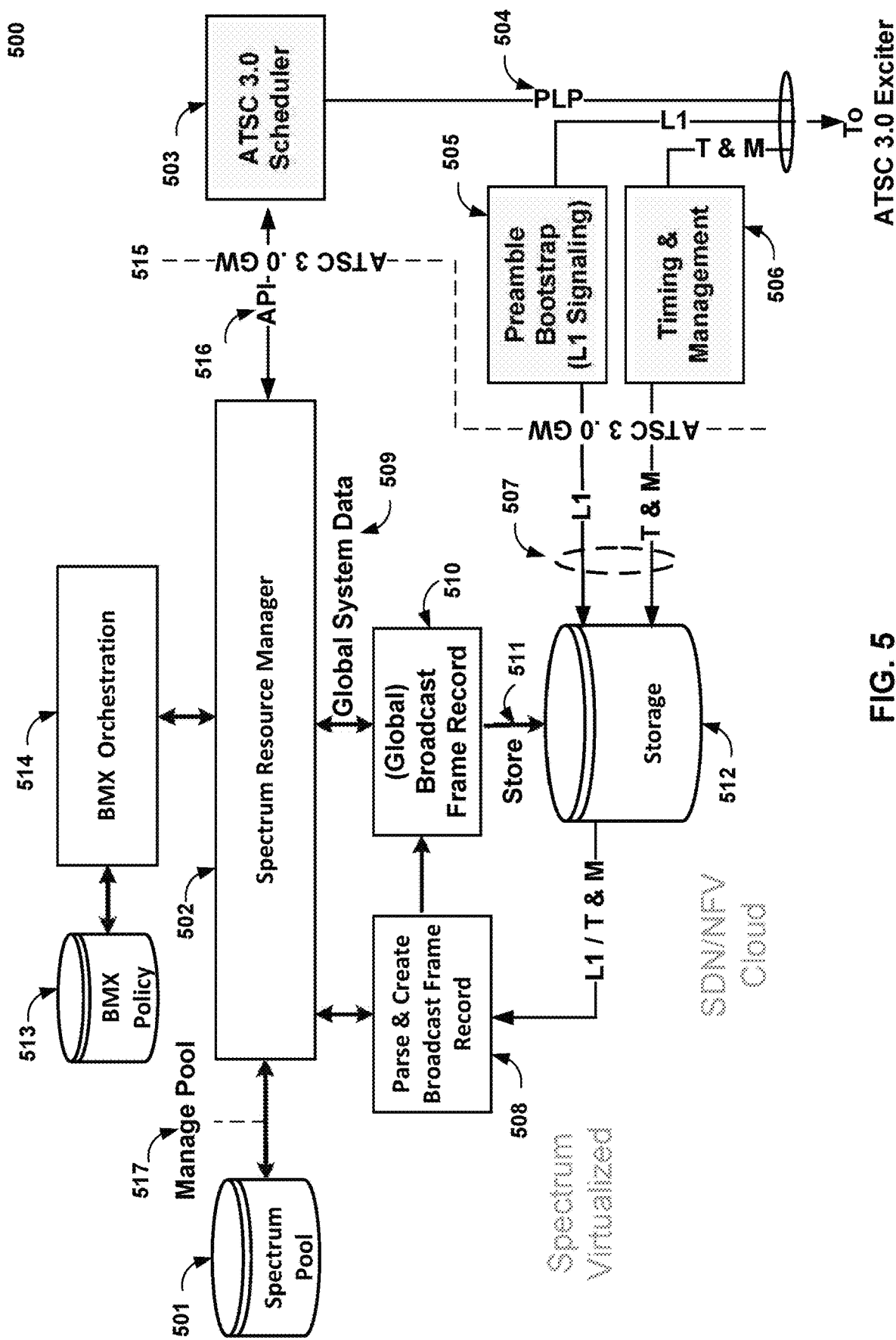
FIG. 5 illustrates a high-level block diagram of cloud spectrum virtualization in accordance with some embodiments/aspects.

FIG. 5 illustrates a high-level block diagram of cloud spectrum virtualization in accordance with some embodiments/aspects. A block diagram 500 shown in FIG. 5 depicts an SDN/NFV cloud environment for spectrum virtualization that includes an ATSC 3.0 gateway to the right of dashed line 515 and SDN/NFV cloud elements to the left of the dashed line 515 running in a datacenter. The ATSC 3.0 gateway can include an ATSC 3.0 scheduler 503 that can create PLPs 504, L1 signaling 505, and Time and Management (T & M) 506 to send to an ATSC 3.0 exciter as shown in FIG. 5. By way of a non-limiting example, the ATSC 3.0 gateway functions can be physical network functions (PNF) running on legacy hardware or virtual network functions (VNF) running on commodity compute, storage and networking virtualized in the cloud environment.

In some embodiments/aspects, a method for the spectrum virtualization can be as follows. A spectrum pool 501 can contain spectrum resources of one 6 MHz channel defined in units of samples (T) shared by a total of N number of BVNOs. A spectrum resource manager (SRM) entity 502 can manage the spectrum pool 501, according to A/321 and A/322. The SRM 502 can abstract ATSC 3.0 physical layer details from BMX orchestration entity 514 and provides services to the BMX orchestration entity 514 driven by BMX policy 513 stored in a database. The BMX policy 513 reflects the spectrum sharing agreements among the BVNOs.

The SRM 502 being ATSC 3.0 standard agent provides services to the BMX orchestration 514 responsible for end-to-end system orchestration and business. The SRM 502 requests an ATSC 3.0 scheduler 503, via an application programming interface (API) 516 between the ATSC 3.0 scheduler 503 and the SRM 502, to construct an ATSC 3.0 frame with N PLPs for the N BVNOs requesting services from the BMX orchestration 514 with resources in the spectrum pool 501. The ATSC 3.0 frame is preprocessed by the ATSC 3.0 scheduler 503, L1 signaling generator 505, and T&M 506 to generate L1 signaling and T&M signaling, collectively as information 507, for storing in a storage 512. By way of a non-limiting example, the storage 512 may be cloud-based.

The information 507 is then parsed in a broadcast frame record 508 to identify samples (T) usage of PLPs in an ATSC 3.0 frame to prepare to create a broadcast frame record. The SRM 502 then uses global system data 509 provided by the BMX orchestration 514, including information identifying BVNOs and IP flows used in the PLPs, to create a "global broadcast frame record' 510, which includes TIA timestamp according to timing and management signaling 506 indicating the time of emission in the spectrum.

The global broadcast frame record created for this emission time TAI on this 6 MHz spectrum for this ATSC 3.0 frame is then stored via an interface 511 in the storage 512. By way of a non-limiting example, data records stored in the storage 512 can be used for verifying usage in BMX orchestration and system operation, etc.

In some embodiments/aspects, the spectrum pool 501 can be updated via an interface 517 to reflect the usage and distribution of samples (T) in an ATSC 3.0 frame for each BVNO. The SRM 502 is an agent and has a theoretical knowledge of A/321 and A/322 standards of samples (T) to build frame requested 516. Because the real-time scheduler 503 is a non-ideal, there may be a difference between how the SRM 502 asked the ATSC 3.0 scheduler 503 to construct an ATSC 3.0 frame and how the ATSC 3.0 scheduler 503 built the ATSC 3.0 frame. Therefore, the spectrum pool 501 may be updated to reflect the actual usage as reported in the information 507 and what the SRM 502 theoretically assumed the ATSC 3.0 frame required.

The spectrum virtualization 500 described above is agnostic to what the IP flows constituting a PLP represent since LDPC 303 and N-QAM 304 options available for PLP give great freedom in creating a wide range of wireless services using ATSC 3.0.

Also, using extended ATSC 3.0 OFDM numerology as described in U.S. patent application Ser. No. 16/697,976, titled "ATSC 3.0 Physical Layer Extensions to Enable Mobility Broadcast 5G Convergence," and filed on Nov. 27, 2019, can enable the convergence of broadcast and 5G in 3GPP release 16 and beyond.

Figure 6:
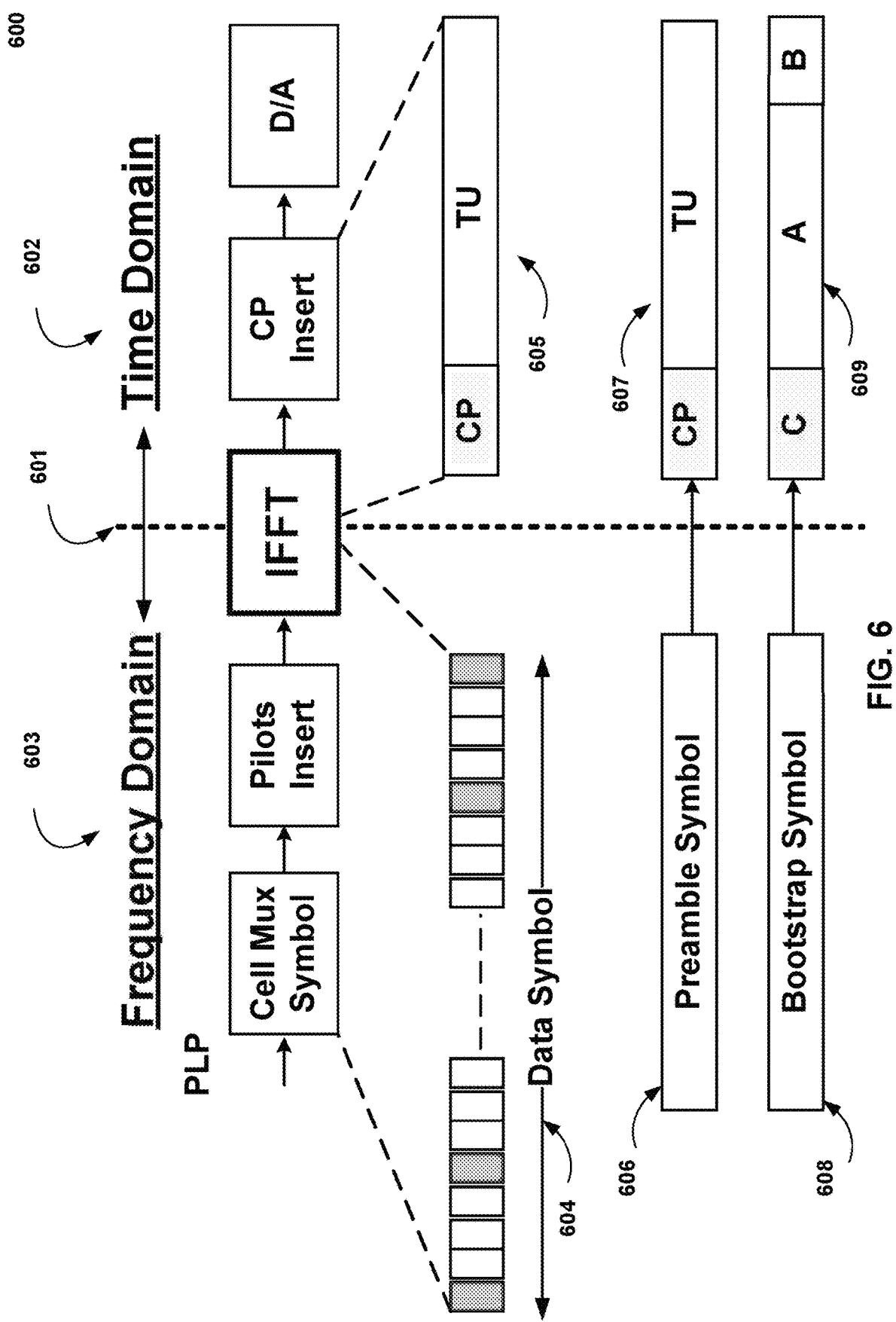
FIG. 6 illustrates elements of an ATSC 3.0 exciter showing the three OFDM symbol types to be analyzed in both the time and frequency domains, in accordance with some embodiments/aspects.

FIG. 6 illustrates elements of ATSC 3.0 exciter showing the three OFDM symbol types to be analyzed in both the time and frequency domains, in accordance with some embodiments/aspects. A block diagram 600, as shown in FIG. 6, shows a focused view of three types of OFDM symbols used in an ATSC 3.0 frame by the ATSC 3.0 exciter 105*a*, for example. An IFFT 601 is the demarcation between a frequency domain 603 and a time-domain 602. The three symbol types are data 604, preamble 606, and bootstrap 608, as shown in the frequency domain 602. The IFFT transforms the symbols into time domain data 605, preamble 607, bootstrap 609 symbols. The analysis of symbol types 605, 607, 609 first starts in the time domain 602. The useful time (TU) portion of 605, 607 are analyzed in the frequency domain. Both 604, 606 symbols can have PLP cells contained in available data cells of these symbols for IP flows of BVNOs. According to some embodiments/aspects, the bootstrap symbols 609 can carry no PLP cells, and the analysis is only performed in the time domain 602. Next, a more detailed analysis of each OFDM symbol type is presented. This is to enable an example use case using several BVNOs sharing the spectrum to be discussed later.

Figure 7:
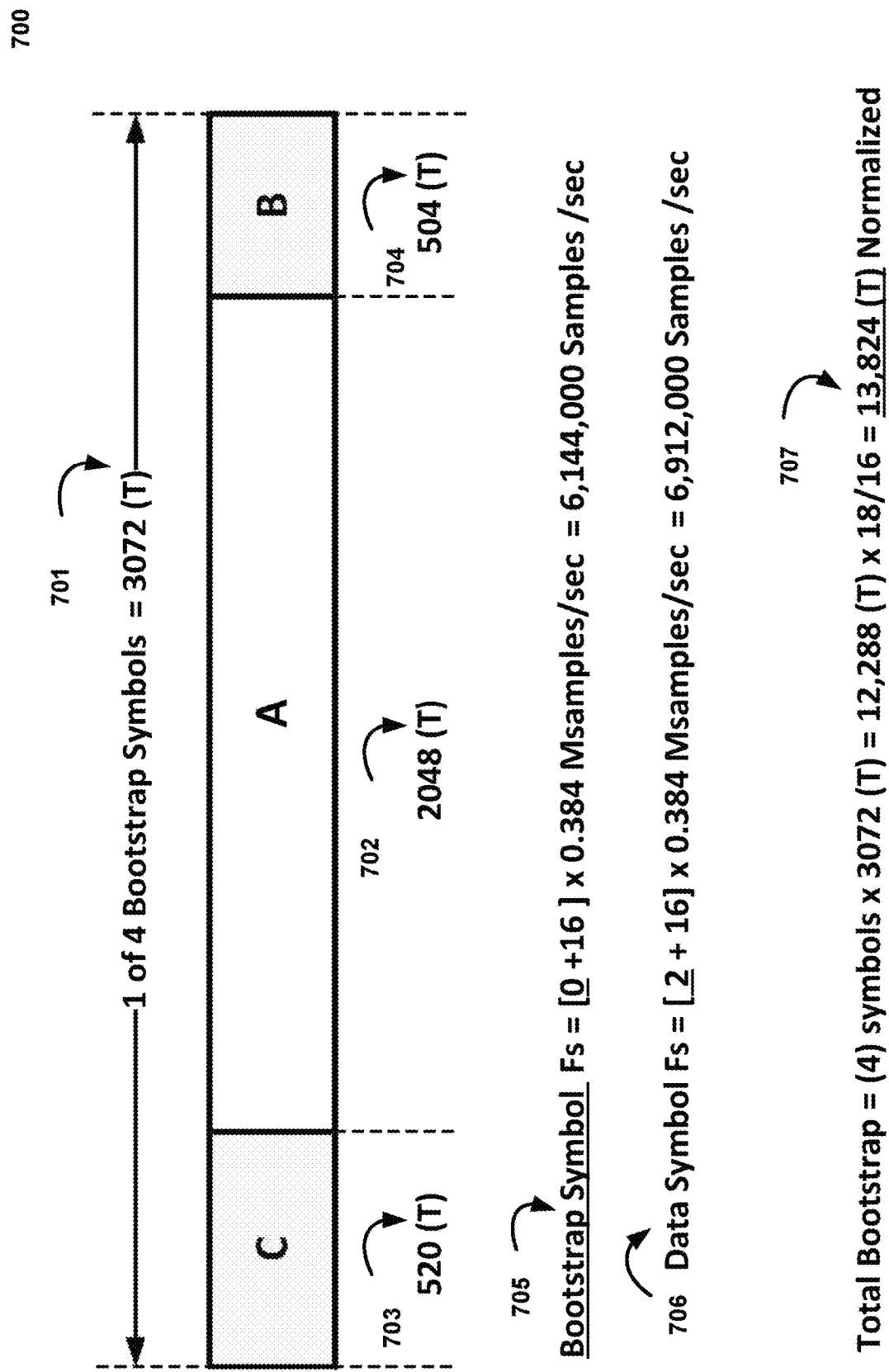
FIG. 7 illustrates details of a bootstrap symbol type of an ATSC 3.0 frame in time-domain for analysis of spectrum resource usage, in accordance with some embodiments/aspects.

According to some embodiments/aspects, the ATSC 3.0 frame 401 always begins with four (4) bootstrap symbols 402, as shown in 400. A block 700, as shown in FIG. 7 depicts an analysis of one of four bootstrap symbols 701. The samples (T) units, as described above, are represented by Fs=(N+16)×384,000 Samples/second. In A/322, the preamble and data symbols N=2. The A/321 bootstrap symbols N=0. These Fs equations are shown in FIG. 7 as bootstrap symbols 705, data and preamble symbols 706.

According to some embodiments/aspects, the bootstrap symbols are analyzed only in the time domain using Samples (T). The bootstrap symbol 701 includes part A 702 with 2048 Samples (T), part B 704 with 505 Samples (T), part C with 520 Samples (T) for each bootstrap symbol. One bootstrap symbol 701 thus has a total of 3072 Samples (T). Therefore, four bootstrap symbols can include 4×3072=12,288 Samples (T). Since N=2 for the majority of symbols, for data symbols, 706 in ATSC 3.0 frame, a normalizing factor (2+16/0+16) or (18/16) can be used in equation 707 to determine the bootstrap can have 13,824 Samples (T) normalized for each ATSC 3.0 frame.

Therefore, since each ATSC 3.0 frame begins with four bootstrap symbols 402, each ATSC 3.0 frame requires 13,824 Samples (T) for the bootstrap. As described herein, 13,824 Samples (T) can be included in the time-domain analysis of each frame for examples to be discussed, and resources from the spectrum pool 501 can be allocated based on the BMX policy 513 reflecting the sharing agreement between BVNOs sharing the spectrum.

Figure 8:
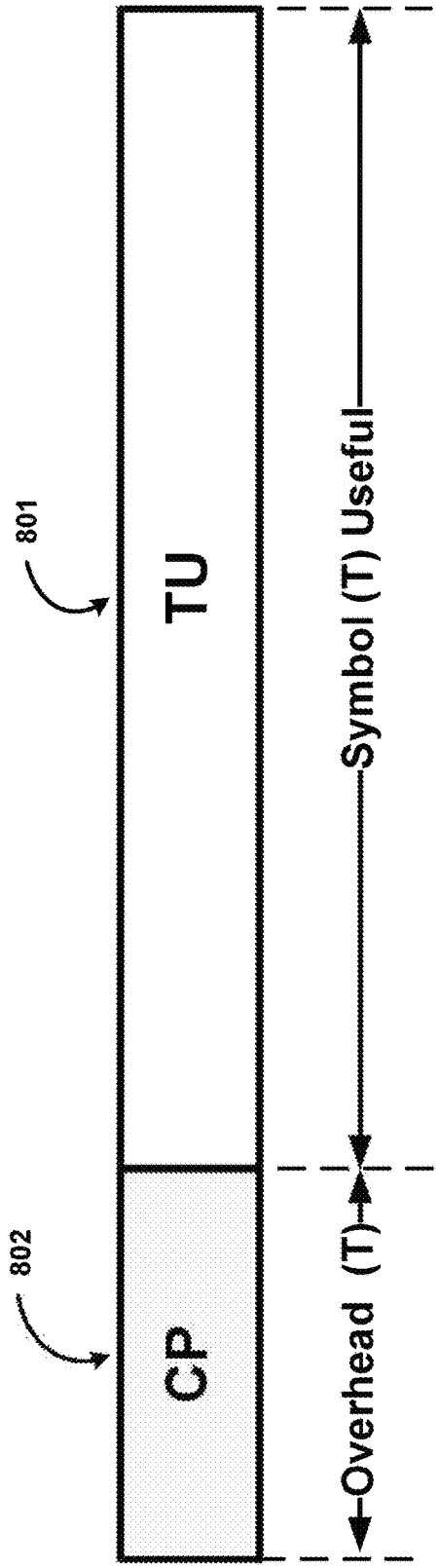
FIG. 8 illustrates details of a preamble symbol type of an ATSC 3.0 frame shown in time-domain for analysis of spectrum resource usage, in accordance with some embodiments/aspects.

FIG. 8 illustrates details of a preamble symbol type of an ATSC 3.0 frame shown in time-domain for analysis of spectrum resource usage, in accordance with some embodiments/aspects. A block diagram 800, as shown in FIG. 8, depicts details of one preamble symbol in the time-domain. The preamble symbol has a useful time (TU) 801 and cyclic prefix (CP) 802. The CP 802 is required for a receiver but does not carry PLP data cells. Accordingly, the CP 802 can be considered as overhead samples (T) for accounting purposes. According to some embodiments/aspects, there are twelve options for CP size in Samples (T) to select, as shown in table 1406, as described below. The equation 804 depicts IFFT sizes available, as shown in ATSC 3.0 OFDM numerology table 1401. The Fs with N=2 is shown in equation 803. The OFDM equation ΔF 805 can be used for sub-carrier or cell spacing in the frequency domain. The TU portion 801 is proportional to IFFT size selected and is analyzed in the frequency domain as it can carry PLP cells in the preamble symbol, as is shown in block diagram 300.

The TU samples (T) 801 is analyzed next in the frequency domain. Therefore, CP 802 is considered as time-domain overhead Samples (T). The TU portion 801 is analyzed, and some samples (T) can be used for PLP data cells and the others for the required overhead in the frequency domain. The total distribution of samples, for example, how used and by which BVNO, is reflected in the spectrum pool 501 allocated based on BMX policy 513 reflecting sharing agreement between the BVNOs as shown by examples later.

Figure 9:
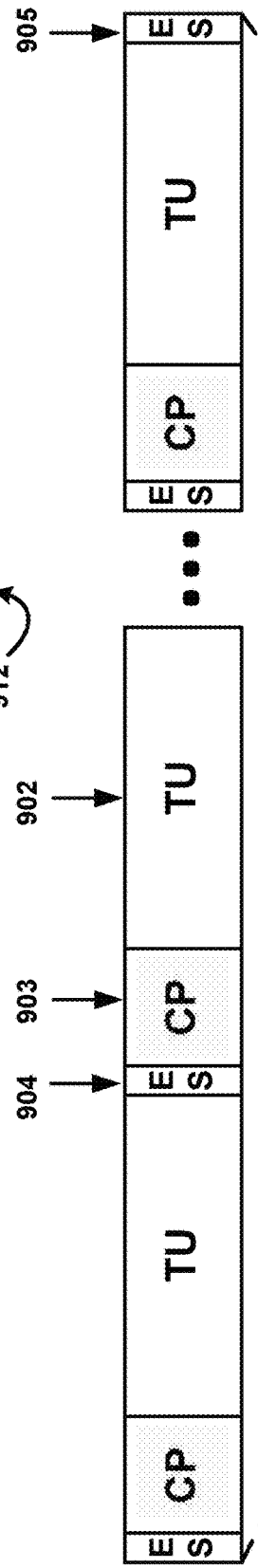
FIG. 9 illustrates details of a data symbol type of an ATSC 3.0 frame shown in time-domain for analysis of spectrum resource usage, in accordance with some embodiments/aspects.

FIG. 9 illustrates details of a data symbol type of an ATSC 3.0 frame shown in time-domain for analysis of spectrum resource usage, in accordance with some embodiments/aspects. A block 900, as shown in FIG. 9, depicts N data symbols 901 in the time-domain part of ATSC 3.0 frame 908, including bootstrap symbols 906 and preamble symbols 907. Each of the N data symbols 901 can include a TU 902 and a CP 903 in the time-domain. The SRM, for example, 103*a*, 103*b*, 103*c*, and/or 103*d*, can select the ATSC 3.0 frame length 908 for spectrum sharing to be a time aligned length, for example, from 50 ms-5000 ms in 5 ms increments. In some cases, to achieve this length, it may require excess samples ES (T) 904 to be added to the CP 903 chosen from table 1506 of each data symbol with equal distribution samples (T) in each CP and any remaining ES added as an end of the last data symbol 905 in the ATSC 3.0 frame 908.

Equations for Fs 909, IFFT size 910, cell spacing frequency domain 911, TU 912 are the same as discussed in preamble 800. Next, a more detailed analysis in the frequency domain of the TU portion of the data symbol and preamble symbol is discussed to determine the usage of samples (T).

Figure 10:
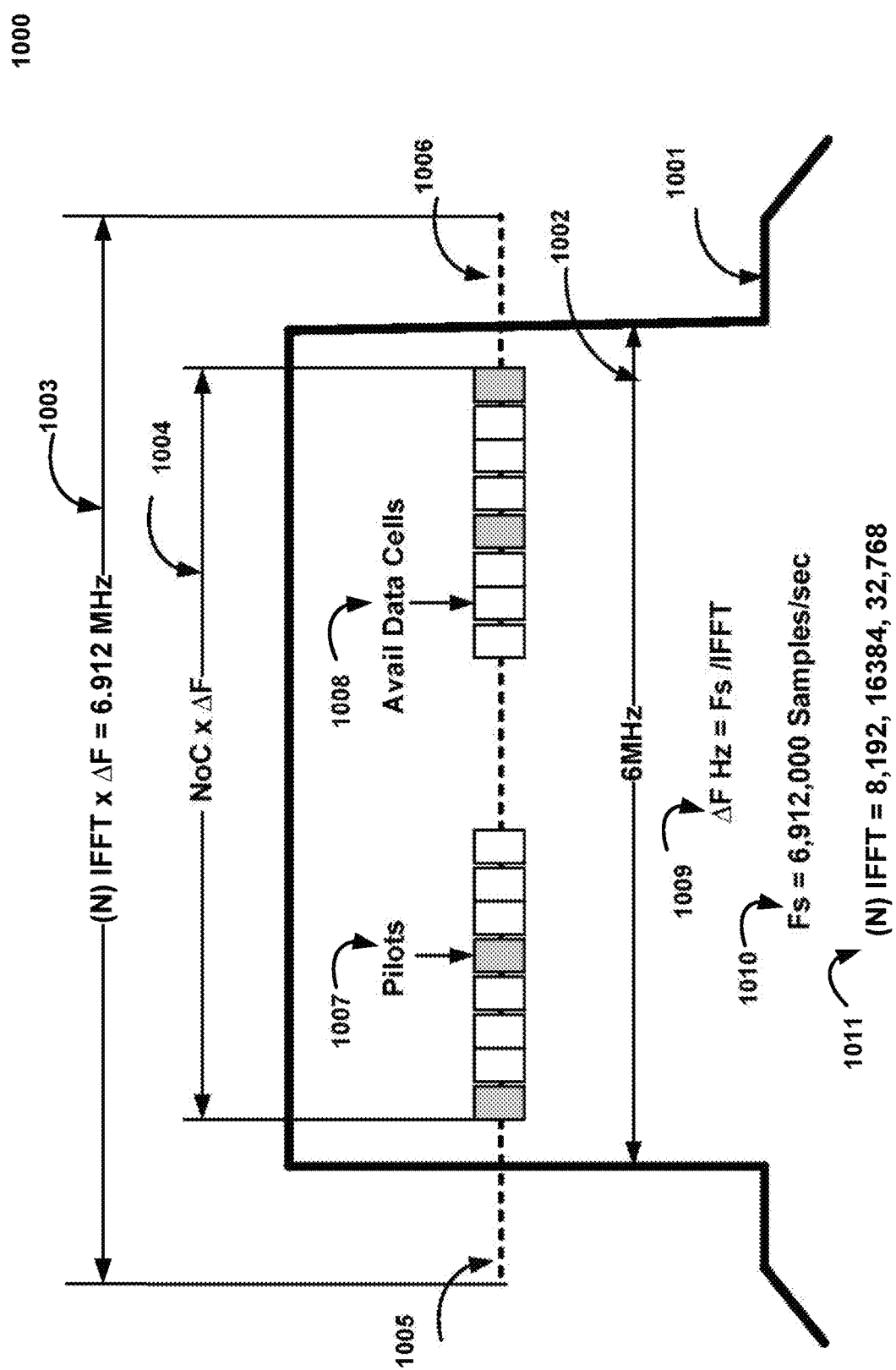
FIG. 10 illustrates details of a data symbol type of ATSC 3.0 frame in the frequency domain for analysis of spectrum resource usage, in accordance with some embodiments/aspects.

FIG. 10 illustrates details of a data symbol type of ATSC 3.0 frame in the frequency domain for analysis of spectrum resource usage, in accordance with some embodiments/aspects. A block 1000, as shown in FIG. 10, shows the frequency domain analysis for the distribution of Samples (T) from a data or preamble type symbol. The FCC 6 MHz bandwidth mask 1001 is shown that determines the signal energy limits as a function of power. The 6 MHz bandwidth 1002 is shown as used, for example, in the United States. The same equations for Fs 1010, IFFT size 1011, cell spacing in the frequency domain 1009 are repeated for reference.

The total bandwidth (N) IFFT 1003 is 6,912 MHz. To achieve the desired value for the cell spacing in the frequency domain 1009, some Samples (T) of IFFT 1005, 1006 are set to zero in IFFT to produce no power in the emitted signal. The samples (T) of IFFT 1005, 1006, can be considered as an overhead in the required frequency domain. This results in a useful bandwidth 1004, and the remaining cells of the symbol shown can be either be available data cells samples (T) 1008 that can carry PLP data or are used for required pilot signals samples (T) 1007 for the receiver. The pilot samples (T) 1007 can be considered as frequency domain overhead. This analysis is done for each data and preamble symbol, and the resulting total available data cells 1008 that can support PLP data is determined for the ATSC 3.0 frame as is the total required overhead. This analysis will be shown by examples later to understand the methodology used for spectrum sharing.

Figure 11:
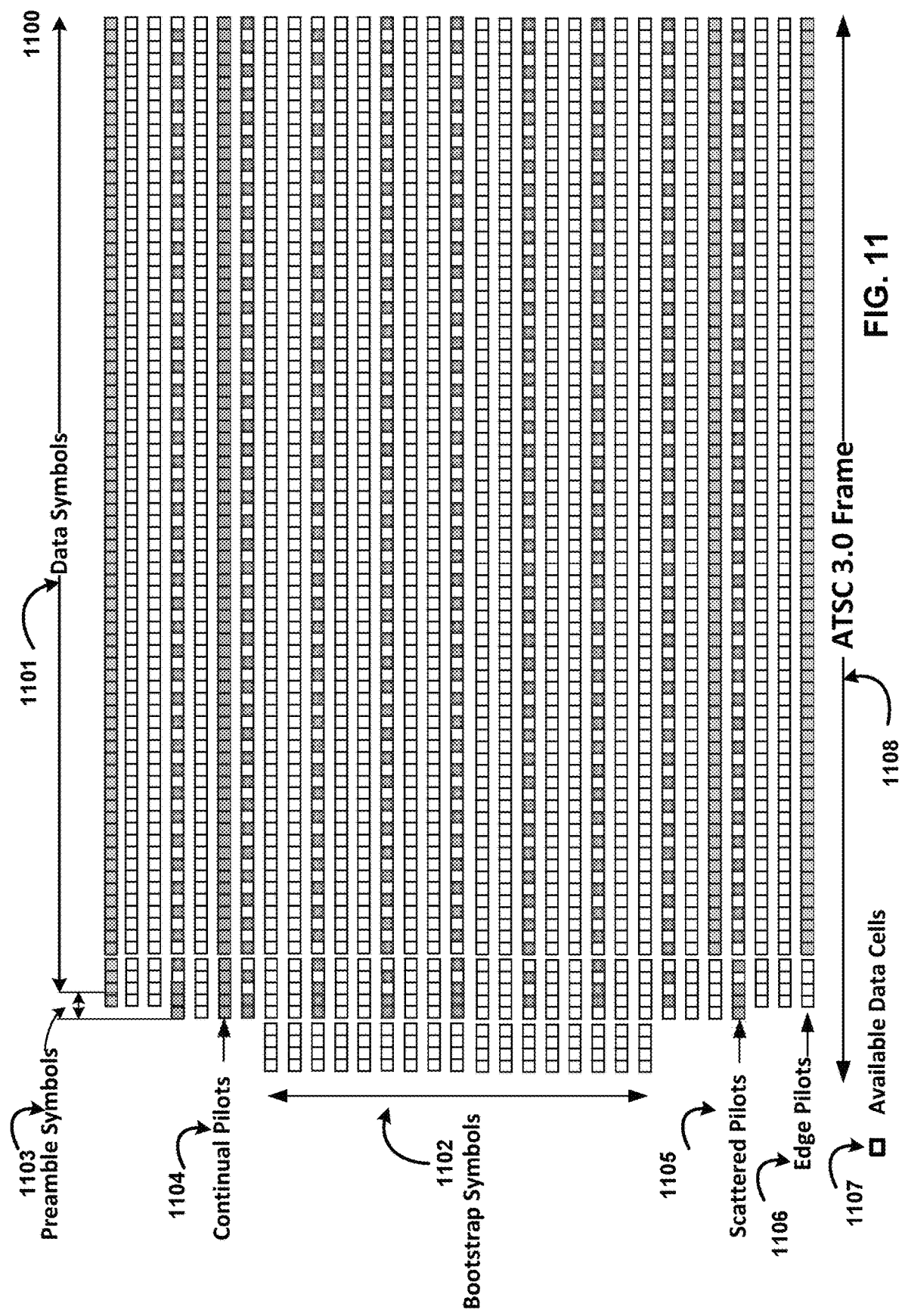
FIG. 11 illustrates details of an ATSC 3.0 frame for analysis of spectrum resource usage, in accordance with some embodiments/aspects.

FIG. 11 illustrates details of an ATSC 3.0 frame for analysis of spectrum resource usage, in accordance with some embodiments/aspects. A block 1100, as shown in FIG. 11 depicts more details of an ATSC 3.0 frame 1108 in the frequency domain showing the distribution of Samples (T). The data symbols type 1101 and preamble symbol type 1103 have both available data cells 1107 that can support PLP data and several types of pilot signals. There are continual pilots 1004, scatter pilots 1105, edge pilots 1106, which Samples (T) are considered overhead in the frequency domain. By way of a non-limiting example, the four bootstrap symbols 1102 with 13,824 samples (T) can also be considered overhead.

Figure 12:
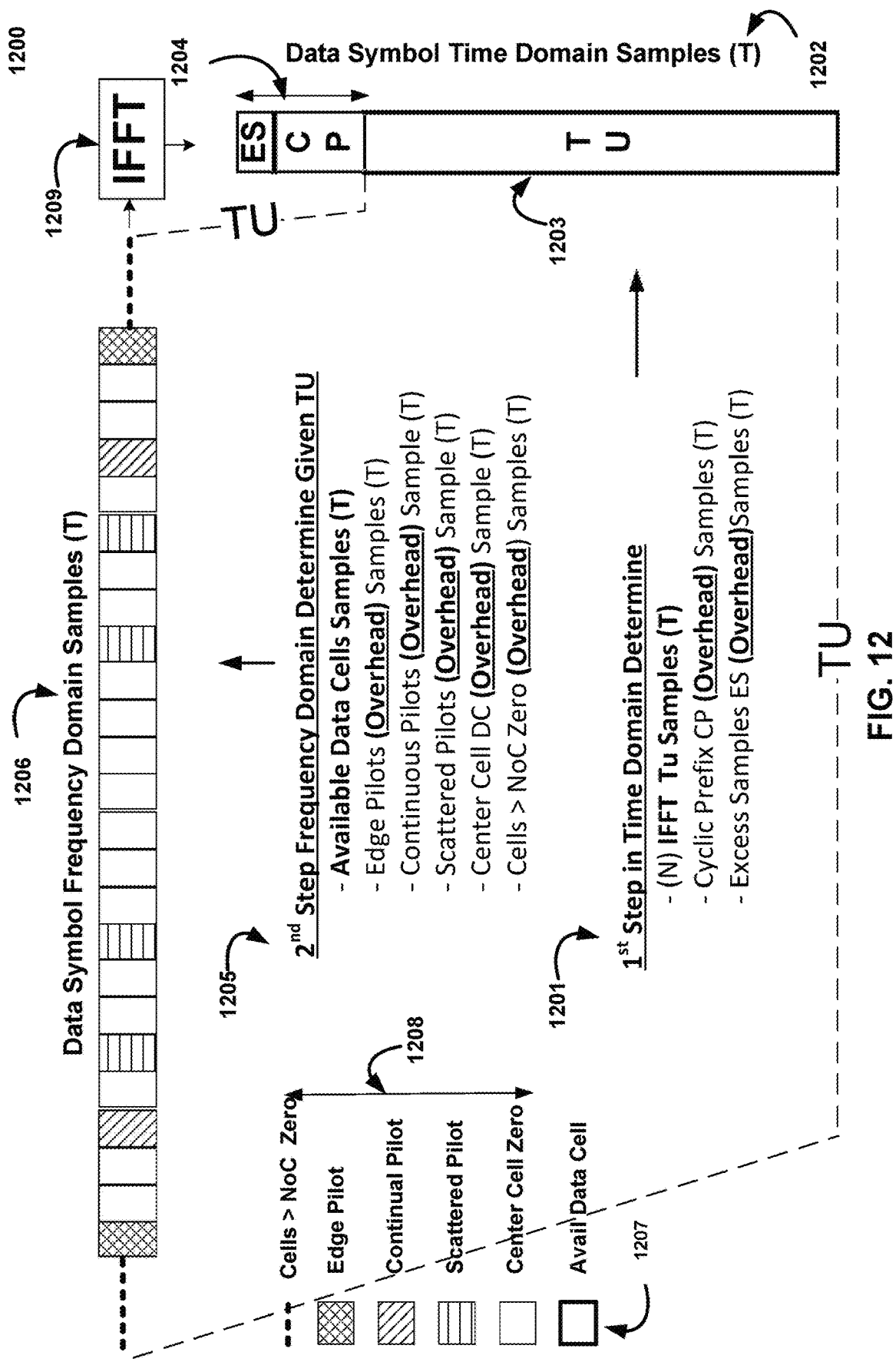
FIG. 12 illustrates a two-step procedure of the detailed analysis of one data symbol in both the time-domain and then the frequency domain, in accordance with some embodiments/aspects.

FIG. 12 illustrates a two-step procedure of the detailed analysis of one data symbol in both the time-domain and then the frequency domain, in accordance with some embodiments/aspects. A block 1200 shows the summary of analysis for data symbols 1101 and preamble symbols 1103 in time domain 1202 and frequency domain 1206 using IFFT 1209 that is performed on each ATSC 3.0 frame to create a broadcast frame record 510. The bootstrap 1102 is a constant 13,824 Samples (T) overhead 700 in each frame not shown. The final result is a number of available data cells in an ATSC 3.0 frame to support data content driven by the BMX policy 513, which, for example, can be adaptable and set rules. How spectrum Samples (T) 501 are shared between N BVNOs can be adjusted easily over time with the BMX orchestration 514 for business use cases to be discussed and shown by detailed examples. The virtualization and orchestration of the low-band broadcast spectrum can enable new business use cases, including convergence with 5G mobile virtual network operator MVNO with BVNO in the future.

By way of a non-limiting example, the first step 1201 begins in the time domain to determine the data symbol 900 shown or preamble symbol 800, TU 1203, and overhead 1204 in the time domain. The second step 1205 can use the TU 1203 to analyze in the frequency domain. This is to determine total available data cells 1207 that can carry PLP data in each preamble symbol 800 and data symbol 900 and frequency-domain overhead 1208.

In the following, an example use case of three BVNOs equally sharing the spectrum resources of a 6 MHz channel using ATSC 3.0 is discussed.

FIGS. 13A-13C illustrate a detailed example of an ATSC 3.0 frame and analysis based on three BVNOs equally sharing broadcast spectrum resources of a 6 MHz channel, in accordance with some embodiments/aspects. By way of a non-limiting example, an ATSC 3.0 frame 1301 of 250 ms in length is shown. As described above, the ATSC 3.0 frame length can be selected in increments of 5 ms 1314. The three OFDM symbol types can include four bootstrap symbols 1302, one preamble symbol 1303, and one hundred seventy-five data symbols 1304, for example. These symbols can be analyzed in the time domain and frequency domain, as discussed with reference to FIG. 12 using syntax and semantics 1305, 1312, and/or 1321.

The timing & management syntax 1305 and the L1 signaling, including L1 Basic 1312 and L1 Detail 1321 syntax values, are used in the example. The ATSC 3.0 gateway 515 shown provides syntax and semantics 1305, 1312, and 1321 to the BMX cloud 500 via an interface. The syntax and semantics 1305, 1312, and 1321 for the bootstrap symbols 1302, the preamble symbol 1303, and the data symbols 1304 are the required syntax and semantics per A/321 and/or A/322 standards, and for which the full syntax is described in the ATSC A/324 standard. Some supplementary information in FIGS. 14A-14C and 15-17 are first introduced to set a proper understanding of the example before returning to 1300 and the detailed analysis.

FIGS. 14A-14C illustrate the ATSC 3.0 A/322 standard tables used to analyze the spectrum resource usage of the example from FIGS. 13A-13C, in accordance with some embodiments/aspects. As shown in FIG. 14-14C, A/322 tables 1401, 1402, 1403, 1404, 1405, and 1406 can be used for semantics in the analysis of the syntax of the bootstrap symbols 1302, the preamble symbol 1303, and the data symbols 1304.

Figure 15:
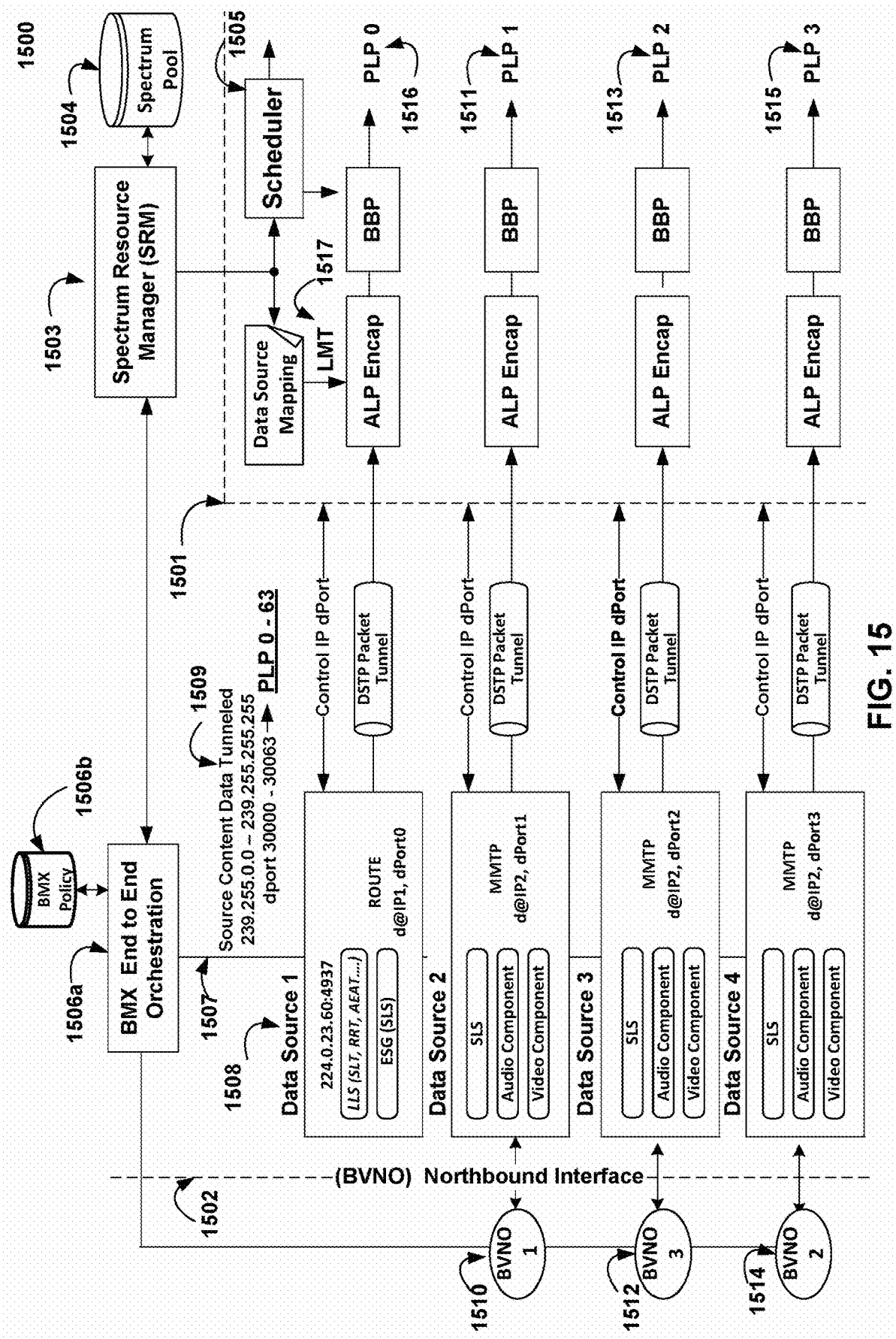
FIG. 15 illustrates broadcast market exchange (BMX) control and configuration and end-to-end orchestration used for the example from FIGS. 13A-13C, in accordance with some embodiments/aspects.

FIG. 15 illustrates BMX control and configuration and an end-to-end orchestration required and used for the example from FIGS. 13A-13C, in accordance with some embodiments/aspects. A block shows a BMX orchestration entity 1506a, a BMX policy entity 1506b that controls system configuration. An SRM 1503 can control a spectrum pool 1504, and with instructions received from the BMX orchestration entity 1506a, the SRM 1503 can configure a scheduler 1505 in an ATSC 3.0 gateway 1501.

In some embodiments/aspects, the BMX orchestration entity 1506a can assign a unique user ID number to BVNOs 1510, 1512, and 1514, and authorize and orchestrate IP Flows over a northbound interface 1502 to BMX cloud.

In some embodiments/aspects, the BMX orchestration entity 1506a can assign all multicast IP addresses and UDP port numbers in the system, including via an interface 1507 to data sources 1508. A list of IP multicast addresses and port numbers permitted in the standard for data sources as 1509 can be provided as input to the ATSC 3.0 gateway 1501 and then encapsulated into a plurality of PLPs. By way of a non-limiting example, the IP multicast port numbers 30000-30063 can directly map to PLPs 0-63 possible per frame. The BMX 1506a via SRM 1503 configures data source mapping in 1501 that maps IP addresses and port numbers to each PLP and used in the link-mapping table LMT 1517, which is then broadcast to a receiver as essential L2 layer signaling.

In some embodiments/aspects, the BMX orchestration entity 1506a can be aware of BVNO IDs and multicast IP flows mapped to each PLP. This information then becomes an essential part of the global system data 509 used to create a global broadcast frame record 510, which is discussed in more detail with reference to FIG. 18.

By way of a non-limiting example, the three BVNOs 1510, 1512, 1514 can be sharing spectrum equally, and each BVNO 1510, 1512, and 1514 can be assigned a unique PLP ID, for example, 1511, 1513, and 1515, respectfully. Further, a common shared PLP 1516 can be used for essential signaling information required by BVNOs and results in four PLPs being assigned as 1511, 1513, 1515, and 1516.

Figure 16:
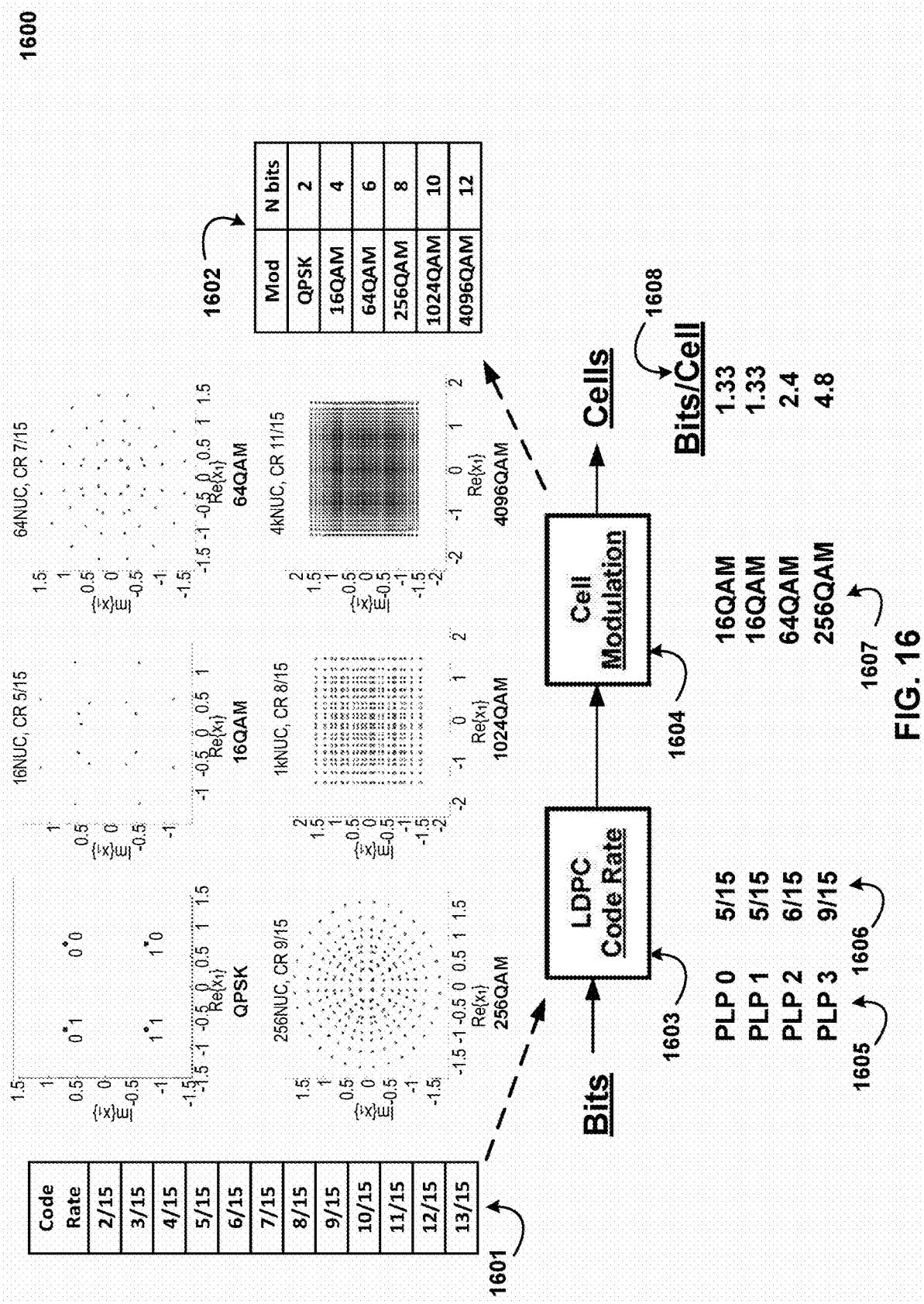
FIG. 16 illustrates physical layer pipe (PLP) configurations of Low-Density Parity Check (LDPC) and modulation for the example from FIGS. 13A-13C, in accordance with some embodiments.

FIG. 16 illustrates PLP configurations of LDPC and modulation for the example from FIGS. 13A-13C, in accordance with some embodiments. A block 1600 depicts the four PLPs 1605 used in the example from FIGS. 13A-13C and described by syntax values in L1 detail 1321. The LDPC code rate 1601 and Mod 1602 correspond to robustness and capacity for each PLP service. The input to LDPC 1603 is in units of bits, and the output of the cell Mod 1604 is in units of cells. For each PLP 1605, the LDPC code rate 1606 selected can be multiplied by N bits per NQAM 1602 selected, and this results in the bits/cell ratio 1608. Therefore, there is a unit mismatch at upper layer data sources processing for the PLP is in units of bits, and the lower physical layer processing of PLP is in units of cells.

The bits/cell ratio 1608 for each PLP can be very different, and this results in system constraint of requiring static assignment of cells per PLP by the scheduler. With no awareness of the bits/cell ratio 1608 at upper layer data sources 1508, the upper layer data source 1508 can be configured to use constant bit rate (CBR) encoder based on the assumption that the cell assignment by the scheduler of each PLP is constant. However, this static operation results in considerable inefficiency and loss of monetization opportunities of spectrum resources for the BVNO. If a more efficient variable bit rate VBR encoder is used by the data sources 1508 alone with no awareness of the bits/cell ratio 1608, the system would not work because of unit mismatch and IP buffer overflows. However, as described below, with reference to FIG. 19, when a scheduler 1906 under an SRM 1902 is in closed-loop feedback to data sources controller 1904, with variable bit rate (VBR) encoders 1903, cells of PLP can be assigned dynamically and adaptively by the scheduler 1906 in real-time. Efficiency optimization using VBR instead of CBR can be obtained, as shown in FIG. 20.

FIG. 17 illustrates results simulation, lab, and field-testing of all PLP configurations for ATSC 3.0 and C/N dB in AWGN reception threshold all possible PLPs and the example from FIGS. 13A-13C, in accordance with some embodiments/aspects. A block 1700 illustrates range in robustness or carrier/noise C/N 1702 to receive the PLP configurations possible. As shown in FIG. 17, the range is about 40 dB, as shown by 1702. The four PLPs configurations selected for the example from FIGS. 13A-13C and using L1 Detail syntax 1321 are identified by bold squares in FIG. 17. The number of bits per cell range from 0.267 bits/cell (2/15, QPSK) to 10.4 bits/cell (13/15, 4096QAM), as shown in FIG. 17 by 1701 and will be discussed further with reference to FIG. 19.

Therefore, the virtualization of the spectrum and sharing of resources is possible and will be discussed by example with reference to FIGS. 13A-13C. Thus, the methodology, as described by various embodiments/aspects in this disclosure, can be used for sharing and optimization of the spectrum resources shared by the BVNOs.

Figure 18:
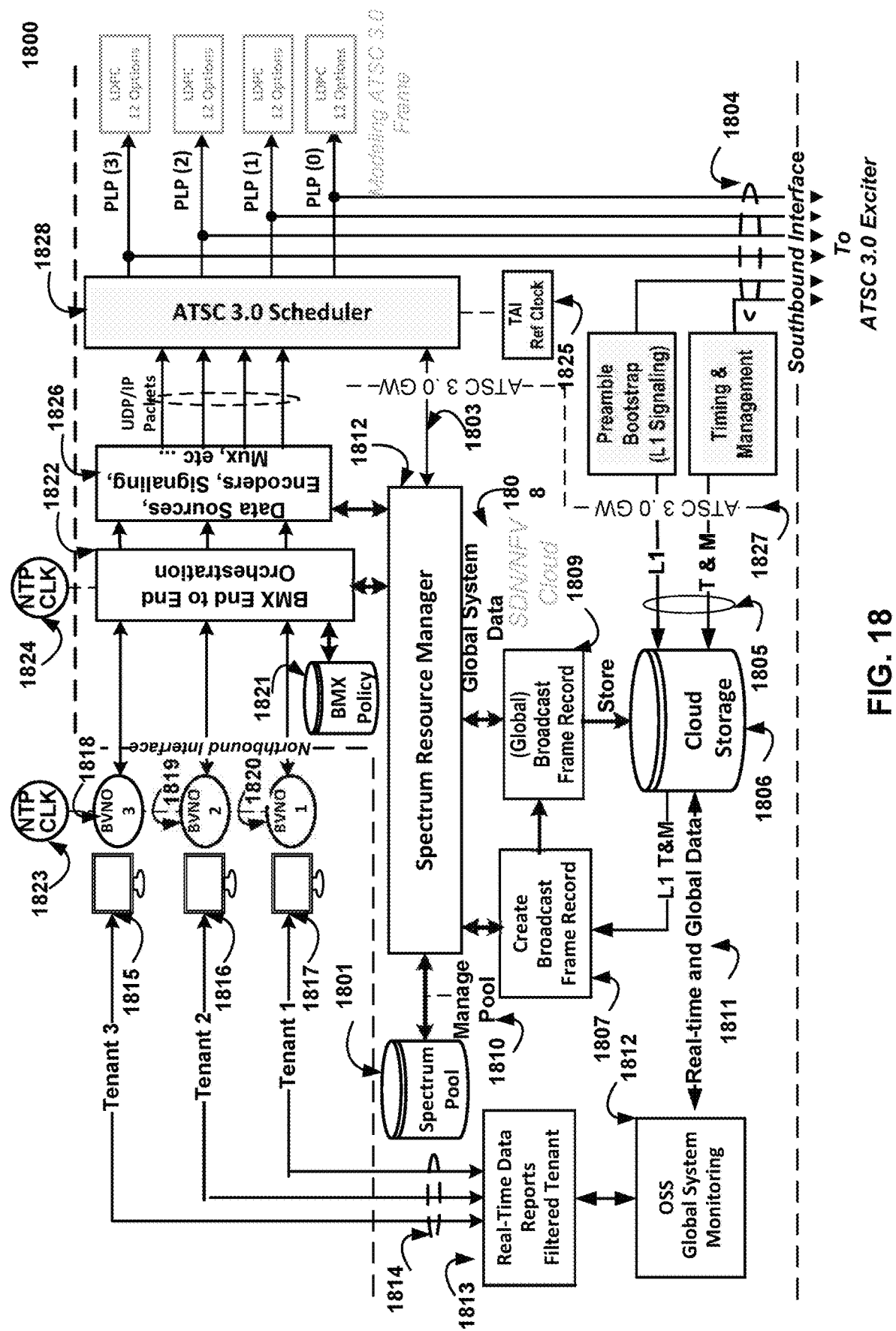
FIG. 18 illustrates end-to-end orchestration using BMX and a detailed walkthrough of creating global broadcast frame records and system operation for the example from FIGS. 13A-13C, in accordance with some embodiments/aspects.

Next, returning to the example from FIGS. 13A-13C for the detailed discussion of analysis and then to FIG. 18 for a more detailed discussion of FIG. 5 using FIGS. 13A-13C.

The timing & management syntax 1305 with a number of bits and example values for various fields are shown by reference numerals 1306-1311. Similarly, the L1 basis syntax 1312 with a number of bits and example value for various fields are shown by reference numerals 1313-1320, and the L1 detail syntax 1321 with a number of bits and example value for various fields are shown by reference numerals 1322-1338.

As described above, analysis of the ATSC 3.0 frame 1301 symbols 1302, 1303, 1304 resource usage in Samples (T) of a 6 MHz channel spectrum pool is first performed in the time domain and then in the frequency domain using TU of symbols as described with reference to FIG. 12 using various formulas/equations shown by reference numerals 1339-1349.

In some embodiments/aspects, using the total available data cells calculated for PLP usage 1348 in frame the distribution of avail data cells into four PLPs each with selected LDPC and Mod is presented by 1350-1354 using references to tables 1401-1406 in the analysis with 1401 table 8.8 being OFDM numerology for ATSC 3.0.

In some embodiments/aspects, the reference numeral 1306 indicates the type of broadcast frame, and the values of 1306 indicate an ATSC 3.0 frame. The ATSC 3.0 L1 signaling architecture was designed for extensibility. It is expected in future new different non-backward compatible broadcast frame types can be used. Accordingly, as indicated by 1306, a major and minor version of the bootstrap symbol can be included in the timing and management syntax 1305. Therefore, the methodology for spectrum sharing can work efficiently when the SRM has knowledge of each new broadcast frame type. Additionally, the ATSC 3.0 standard L1 signaling permits multiplexing in the time domain of different frame types on a frame-by-frame basis.

In some embodiments/aspects, a value of reference numeral 1307 indicates bandwidth, for example, 6 MHz. Then, reference numeral 1308 indicates the value N, for example, the value of N can be 2, in equations 803, 909 Fs=(N+16)×384,000 samples/second. Therefore, Fs is a constant and can be expressed as Fs=6,914 samples (T)/millisecond in a 6 MHz channel.

Further, for the bootstrap symbol, the emission time at a broadcast antenna in TAI seconds 1310 and nanoseconds 1311 is indicated for each frame, which can be used in the identification of each global broadcast frame record 510, 1809.

In some embodiments/aspects, reference numeral 1309 indicates a preamble symbol structure according to table H.1.1, as shown by 1403.

By way of a non-limiting example, first, total number samples (T) 1339 in a frame 1301 of 250 ms length in the time domain can be calculated and indicated by L1 basic syntax 1314 using time aligned frame 1313, 1315.

By way of the non-limiting example, then, a total Samples (T) bootstrap 1340 for bootstrap symbols 1302 in the time domain is shown using the equation shown in FIG. 7.

Then, a number of Samples (T) 1340 in the time domain for the one preamble symbol 1303 is indicated by 1317, 1318 using 1403, 1404.

Then, a number of Samples (T) 1342 in the time domain for the 175 data symbols 1304 is shown based on 1315, 1322, 1323, 1324, 1325, 1326, and referencing tables 1401, 1405, 1406.

Then, total Samples (T) 1343 calculations crosschecks the total samples (T) 250 ms frame 1339. Reference numeral 1344 shows the total samples (T) of overhead for the ATSC frame 1301 in the time domain, and reference numeral 1345 shows the total samples (T) in the frequency domain is calculated shown 1345 for the 176 symbols 1303, 1304 using the value of TU in example 8192 (T).

Then, the available data cells 1346 in preamble 1303 can be calculated using 1319.

Then, the available data cells 1347 in data symbols 1304 can be calculated.

Then, the available data cells 1348 in ATSC 3.0 frame 1301 can be calculated.

Then, the total overhead samples (T) 1349 in the frequency domain can be calculated.

Then, the distribution of total samples (T) 1339 can be verified. The total samples (T) avail data cells frequency domain 1348+samples (T) overhead frequency domain 1349+samples (T) overhead in time domain 1344=1339 samples (T) in 250 ms ATSC 3.0 frame 1301.

Then, using non-dispersed PLP type 1327 for each PLP of the PLPs 1328, including, for example, PLP #0 1329, PLP #1 1330, PLP #2 1331, PLP #3 1332, the configuration and available data cells and supported bps can be calculated.

As shown, reference numeral 1333 indicates the PLP ID assigned by the scheduler. The distribution of total available data cells in the frequency domain can be calculated 1350 and is evenly distributed 1335 with PLP ID0 1329 being commonly shared and PLPs 1330, 1331, 1332 receiving an equal distribution of 364,646 of available data cells in each frame by a scheduler.

The start position of each PLP in a cell of symbol using method 1327 is shown by 1334 and equates graphically to 215a, 215b, 215c in frame 217. In some cases, FEC type 1336 can be used with 16K LDPC only no BCH or CRC. Then, mod selected PLP 1337, and value is indicated in FIG. 16 by 1602. Then, LDPC selected in PLP 1338 and value is indicated in FIG. 16 by 1601.

Then with robustness and the data capacity in bps for each PLP 1351, 1352, 1353, and 1354 can be indicated in FIG. 17 by 1701. Accordingly, any mode and configurations of PLPs in the ATSC 3.0 standard are possible according to embodiments/aspects described herein.

FIG. 18 illustrates end-to-end orchestration using BMX 1800 and a walkthrough of creating global broadcast frame records and system operation for the example from FIGS. 13A-13C, in accordance with some embodiments/aspects. As shown in block 1800, creating global broadcast frame records 1809 and understanding system operation of BVNOs 1818, 1819, 1820 using services of the BMX cloud is described in more detail. A BMX orchestration entity 1822 is driven by business agreements SLA (service-level agreement) between tenants or BVNO, and BMX policy entity 1821 can be adapted to both optimize and monetize the available spectrum resources of each BVNO independently.

In some embodiments/aspects, by way of a non-limiting example, using control and validation of the broadcast spectrum resources in the spectrum pool, the BVNOs can treat some of these resources as a commodity on the BMX orchestration entity 1822. Therefore, according to a BMX policy broadcast spectrum can be monetized on the open market-driven basis for use by other entities as a business transaction. In other words, BMX cloud 1800 can be a programmable broadcast automation platform controlled by the BMX policy for new functionality and opportunity for each BVNO.

In some embodiments/aspects, in the block 1800 to the right of 1827 is the ATSC 3.0 gateway. A TAI clock 1825 is used by a scheduler 1828 to create and send preprocessed PLP data, L1 signaling, and time & management signaling 1804 to an ATSC 3.0 exciter via a southbound interface. The BMX orchestration 1822 using an NTP clock 1824 controls the access of BVNOs bringing IP streams into the BMX cloud 1800 via northbound interface using an NTP clock 1823.

The L1 signaling and T&M data 1805 of the ATSC 3.0 gateway controlled by an SRM 1812 using interface 1803 are stored in a database 1806 in the BMX cloud 1800. The L1 signaling and T&M stored in the database 1806 is then parsed and analyzed to create a broadcast frame record 1807.

However, the broadcast frame record 1807 needs to include in global system data 1808 as provided by the BMX orchestration entity 1822, as discussed with reference to FIG. 15. By way of a non-limiting example, the global system data 1808 can include the BVNO ID, and the IP flows used for each PLP in the global broadcast frame record 1809 and can be stored in the database 1806. The global broadcast frame record 1809, for example, can include bootstrap emission time 1310, 1311, to uniquely identify the frame.

In some embodiments/aspects, an SRM 1812 can use global broadcast frame record 1809 to manage the spectrum pool 1801 using an interface 1810 to keep spectrum pool 1801 up-to-date and accurate regarding the quantity of resources used by each BVNO sharing in an ATSC 3.0 frame according to BMX policy 1821 to validate sharing agreements between BVNOs.

In some embodiments/aspects, the global broadcast frame record 1809 and others frame records stored in the database 1806 can be accessed using an interface 1811 by operation support system (OSS) 1812 for monitoring of end to end system and with view of BVNO operations, which include real-time view of current TAI frame or by parsing other records stored in the database 1806 to create requested reports, etc.

In some embodiments/aspects, by way of a non-limiting example, BVNO tenants 1818, 1819, and 1820 can be virtually isolated and have independent interactive access via interfaces 1814 to real-time data reports 1813 filtered for each BVNO tenant. The real-time data reports 1813 can act as an agent for the BVNO tenants to provide access to the records stored in the database 1806, including real-time and reports 1813 for display on tenant BVNO's premise on the single pane of glass 1815, 1816, 1817. Accordingly, only the tenant BVNO's resources and any monetization of their resources from sale on BMX in the spectrum market, according to BMX policy 1821, can be viewed, verified, and charged by the BMS orchestration entity 1822. By way of a non-limiting example, the sale can be for a fixed constant number of spectrum resources or programmed per time of day in a future market driven by NTP time and/or dynamically sold in real-time using BMX automation as discussed with reference to FIG. 19.

In some embodiments/aspects, by way of a non-limiting example, closed-loop control between the scheduler 1828, the SRM 1812, and data sources 1826 under the BMX orchestration entity 1822 can be used to increase efficiency and new use cases for monetization by the BVNOs.

Figure 19:
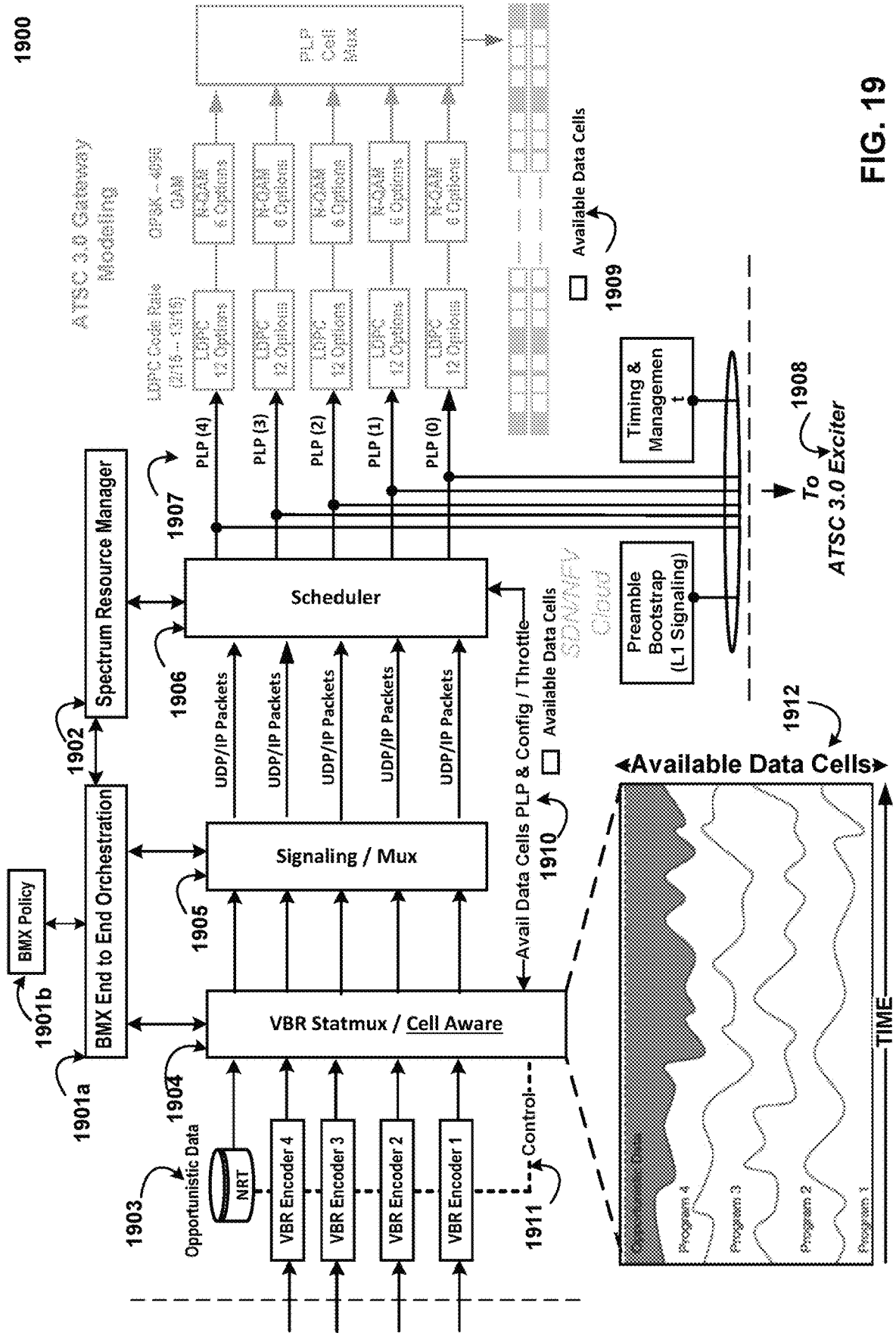
FIG. 19 illustrates a method for increased efficiency driven by SRM and scheduler in closed-loop automation variable bit rate (VBR) encoders with awareness available data cells physical layer, in accordance with some embodiments/aspects.
Figure 20:
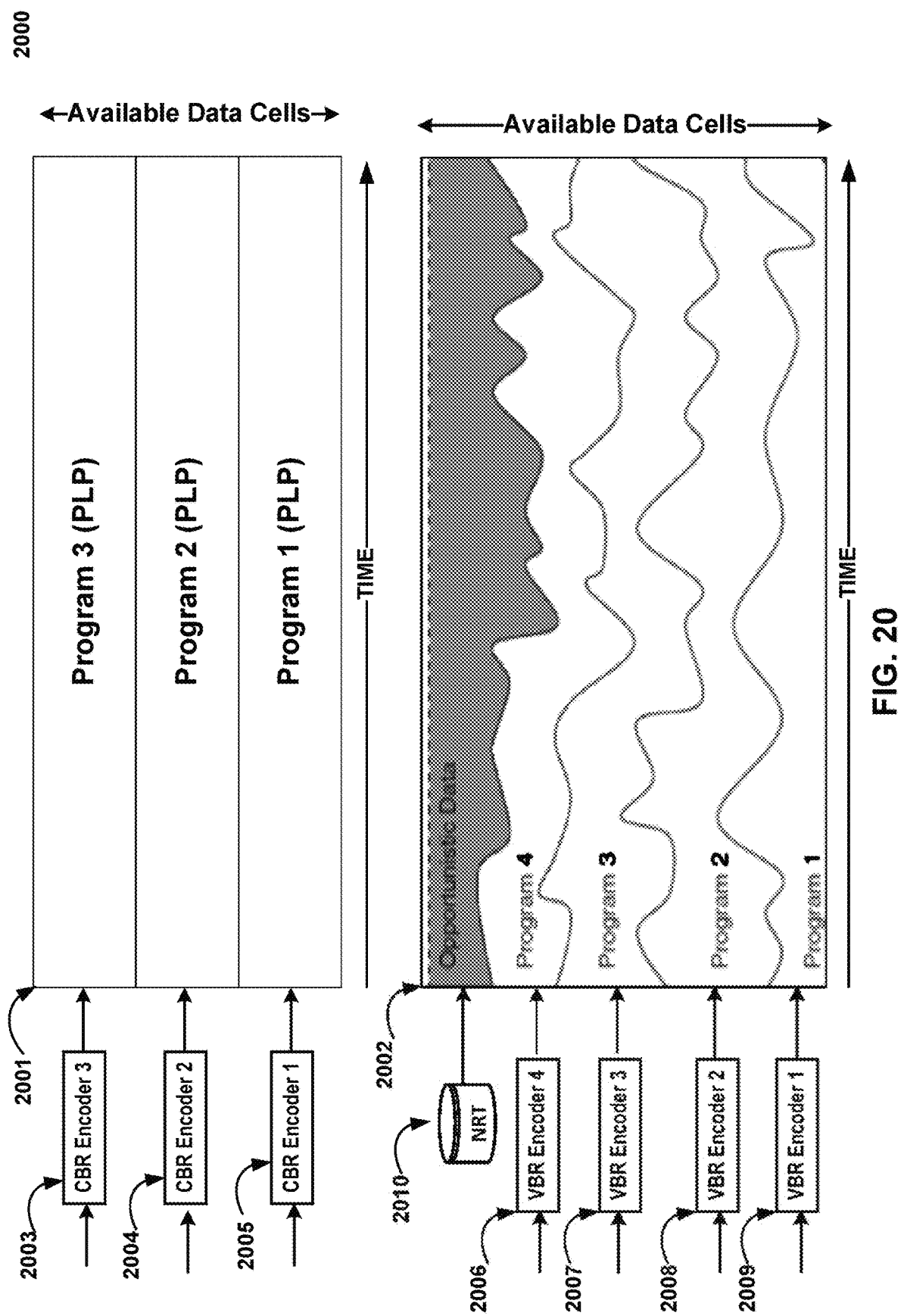
FIG. 20 illustrates a comparison of efficiency between open-loop using constant bit rate encoders CBR and closed-loop automation with variable bit rate VBR encoders, in accordance with some embodiments/aspects.
Figure 21:
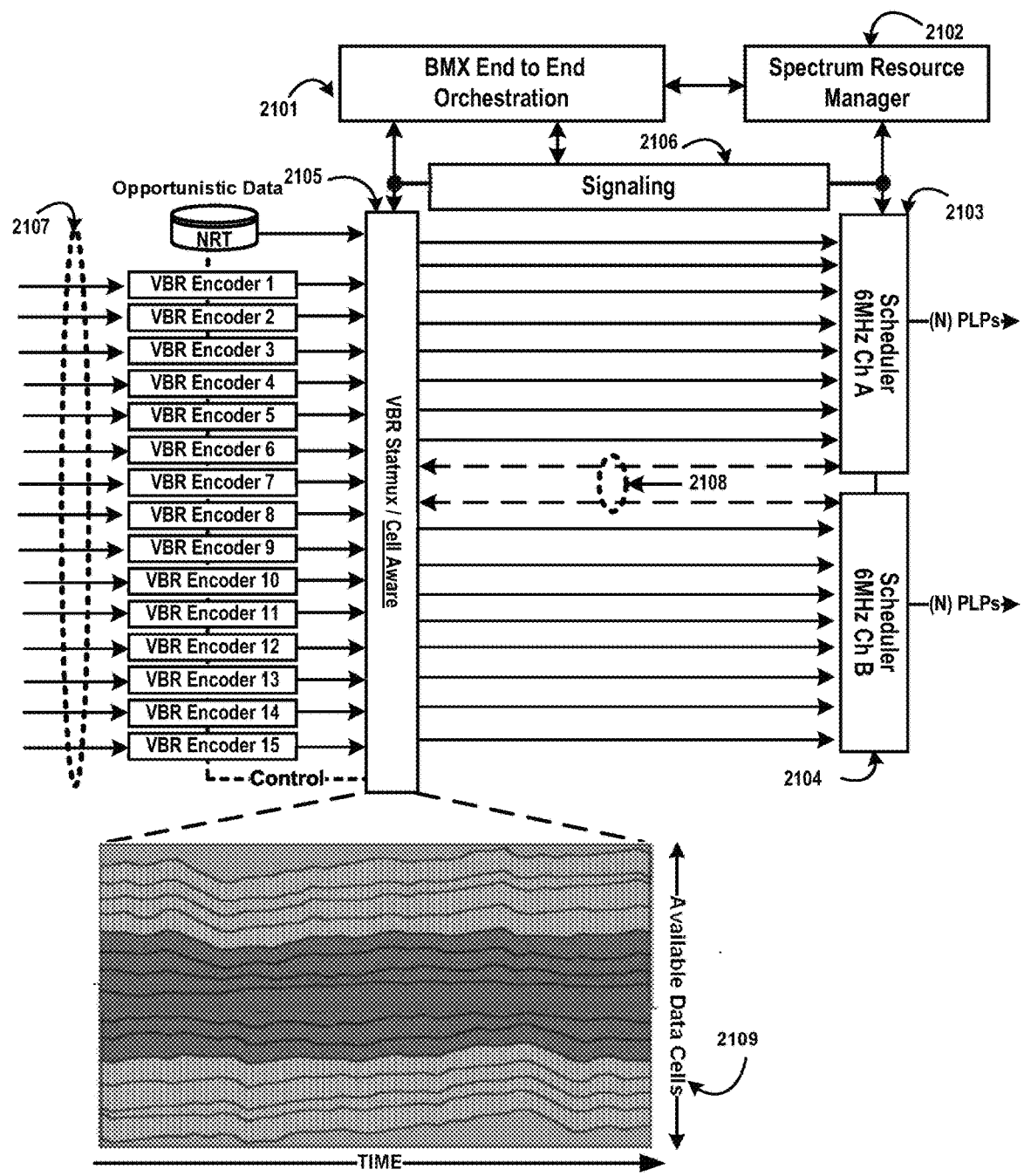
FIG. 21 illustrates two 6 MHz channels bonded together to increase efficiency, in accordance with some embodiments/aspects.

However, before discussing the difference in efficiency and operation goal with reference to FIG. 19, a comparison to a constrained method of operation is described using FIG. 20.

In some embodiments/aspects, a block 2000 of FIG. 20 describes a high-level view of a constrained method operation 2001, which uses a static assignment of avail data cells in each PLP by a scheduler as a function of time. This is required with the use of constant bit rate encoders CBR 2003, 2004, 2005 at data sources upper layer. The upper layer data sources assume a constantly available data cell assignment in each PLP and have no knowledge of different bits/cell ratio 1608 for each PLP at the physical layer, as described above.

As can be seen from FIG. 20, the inefficiency of the CBR encoder method is due to the output data rate is set and then held constant even though video scene complexity changes frame by frame. By way of a non-limiting example, in some cases, for less complex scenes, video quality could be maintained at the same level at a lower output bit rate for the CBR encoder, and for the complex video scenes, the CBR encoder output bit rate is required to be set high enough to maintain better video quality.

Accordingly, the CBR encoder can be used. By using different bits/cell ratio 1608 for PLPs in the same frame and no awareness at the data sources upper layers for the reasons, as discussed with reference to FIG. 16.

In some embodiments/aspects, the same total quantity of available data cells as 2001 is shown as 2002 using VBR encoders 2006, 2007, 2008, 2009. Each VBR encoder can permit encoder bit rate output to vary as a function of time while keeping output video quality constant. A Statmux manager that keeps the total bit rate output constant from pool manages the VBR encoders together in a pool using statistics across a pool of VBR encoders with knowledge of each PLP bits/cell ration 1608 provided by 1910. Accordingly, non-real-time (NRT) data can also be inserted in an adaptive closed-loop method to be discussed with reference to FIG. 19 using knowledge of bits/cell ratio 1608 corresponding to each PLP at the upper layer data sources, for example, a Statmux manager.

In some embodiments/aspects, by way of a non-limiting example, to increase efficiency with multiple PLPs in an ATSC 3.0 frame, PLP configurations all be constrained and set to be the same, which can result in single bits/cell ratio 1608 and constant total input data rate. Further, traditional known VBR encoders with statistical multiplexing methods can then be used for producing a constant data rate output equal to capacity supported by PLPs, and, thereby increasing efficiency. In some cases, the scheduler can receive the individually varying input IP streams and dynamically map to the resources across PLPs. However, this contained operation limits the flexible BVNO or choices available as described with reference to FIG. 17 in ATSC 3.0 standard for PLP configurations and therefore the possible diverse use cases possible and monetization of by having such flexibility provided in the A/322 standard.

In some embodiments/aspects, another option is disclosed, as described in FIG. 19, using BMX and metrics used for spectrum sharing to increase efficiency while maintaining video quality and the flexibility in business models for each BVNO.

In some embodiments/aspects, a block 1900 shows the new concept to improve efficiency flexibility in operations by using BMX orchestration 1901a according to BMX policy 1901b to control an SRM 1902 and a scheduler 1906 preprocessing PLPs 1907 and determining the available data cells 1909 in an ATSC 3.0 frame. The scheduler 1906 sends PLPs, L1 signaling, and timing and management data to an ATSC 3.0 exciter 1908.

The BMX 1901a configures signaling/multiplexer 1905, and a VBR Statmux manager 1904 is ATSC 3.0 cell aware, which in turn controls a pool of VBR encoders and opportunistic data 1903 via an interface 1911. The scheduler 1906 in closed-loop control of VBR Statmux manager 1904 sends, for example, the available data cells for each PLP and configuration 1910, the bits/cell ratio 1608, and other control information to VBR Statmux manager 1904 based on the available data cells for each PLP and configuration 1910.

In some embodiments/aspects, the VBR Statmux manager 1904 can be aware of a number of cells and the bits/cell ratio 1608, etc. for each PLP, which can be used by the VBR Statmux manager 1904 for adaptively control the VBR encoders and opportunistic data insertion 1903 via the interface 1911. Thus, allowing dynamic bit-rate based on instantaneous statistics of video complexity across a pool of video sources in the VBR pool, video quality can be kept constant. This is done as a function of time knowing not to exceed the number of available data cells 1912 in the ATSC 3.0 frame. The VBR Statmux manager 1904 converts cells to bits according to bits/cell ratio 1608 and controls pool in an intelligent manner when multiple PLPs with different bits/cell ratio 1608 is used on an ATSC 3.0 frame by frame basis.

In some embodiments/aspects, a Statmux pool size of a number of VBR encoders can be directly proportional to statistical efficiency gains possible. In other words, using a larger pool size can be more efficient.

In some embodiments/aspects, channel bonding, as described in the ATSC 3.0 standard A/322, can be used to combine or aggregate the spectrum resources of two or more 6 MHz channels in the broadcast band together to increase capacity. However, a receiver capable of receiving aggregated 6 MHz channels may be required for proper reception.

A block 2100 illustrates a larger common Statmux pool 2107 with spectrum resources of 12 MHz because of the bonding of two 6 MHz channels. The VBR Statmux manager 2105 in closed-loop control, as shown in FIG. 19 as 1910 and as 2108 with a scheduler 2103 for a first 6 MHz channel Ch A and a scheduler 2104 for a second 6 MHz channel Ch B controlled by an SRM 2102 and BMX end to end orchestration 2101 that configures a system including Signaling 2106, a VBR Statmux manager 2105 controlling the larger pool of VBR encoders. The assignment of PLP by either the scheduler 2103 and/or scheduler 2104 can vary or adapt as a function of time according to the VBR Statmux manager 2105 with knowledge of each PLP bits/cell ratio 1608 provided over 2108. Accordingly, the L1 signaling of 2103, 2104, and signaling 2106 can be updated of frame by frame basis, and reception can be seamless, thereby increasing efficiency and flexibility and the use of available data cells 2109 in 12 MHz of aggregated channel bandwidth in a more efficient manner using closed loop automation 2100 which will increase the monetization of the available spectrum resources for each BVNO.

The ATSC 3.0 A/321, A/322 framework, and L1 signaling architecture was designed for extensibility, and it is expected in the future new different non-backward compatible broadcast extended frame types will be used. This could enable BMX 1000 system architecture services optimized for broadcast and aligned and converged with 3GPP 5G networks in the future as described in U.S. patent application Ser. No. 16/697,976 titled "ATSC 3.0 Physical Layer Extensions to Enable Mobility Broadcast 5G Convergence" filed on Nov. 27, 2019.

In some embodiments/aspects, a low-density parity-check (LDPC) structure used in ATSC 3.0 can be replaced with an LDPC structure in the future extended frame like that used in 5G LDPC, which can have LDPC code block sizes that are variable and smaller than the fixed 16$k$, 64K code lengths in current ATSC 3.0 frame. In some embodiments/aspects, these new LDPC codes can be punctured and adapted to optimize efficiency and flexibility when used as a throttle at the physical layer side 2108 that works with upper layer VBR Statmux manager 2105 and is more efficient than using the fixed LDPC block sizes in A/322 standard now optimized for mobile and 5G convergence.

Figure 22:
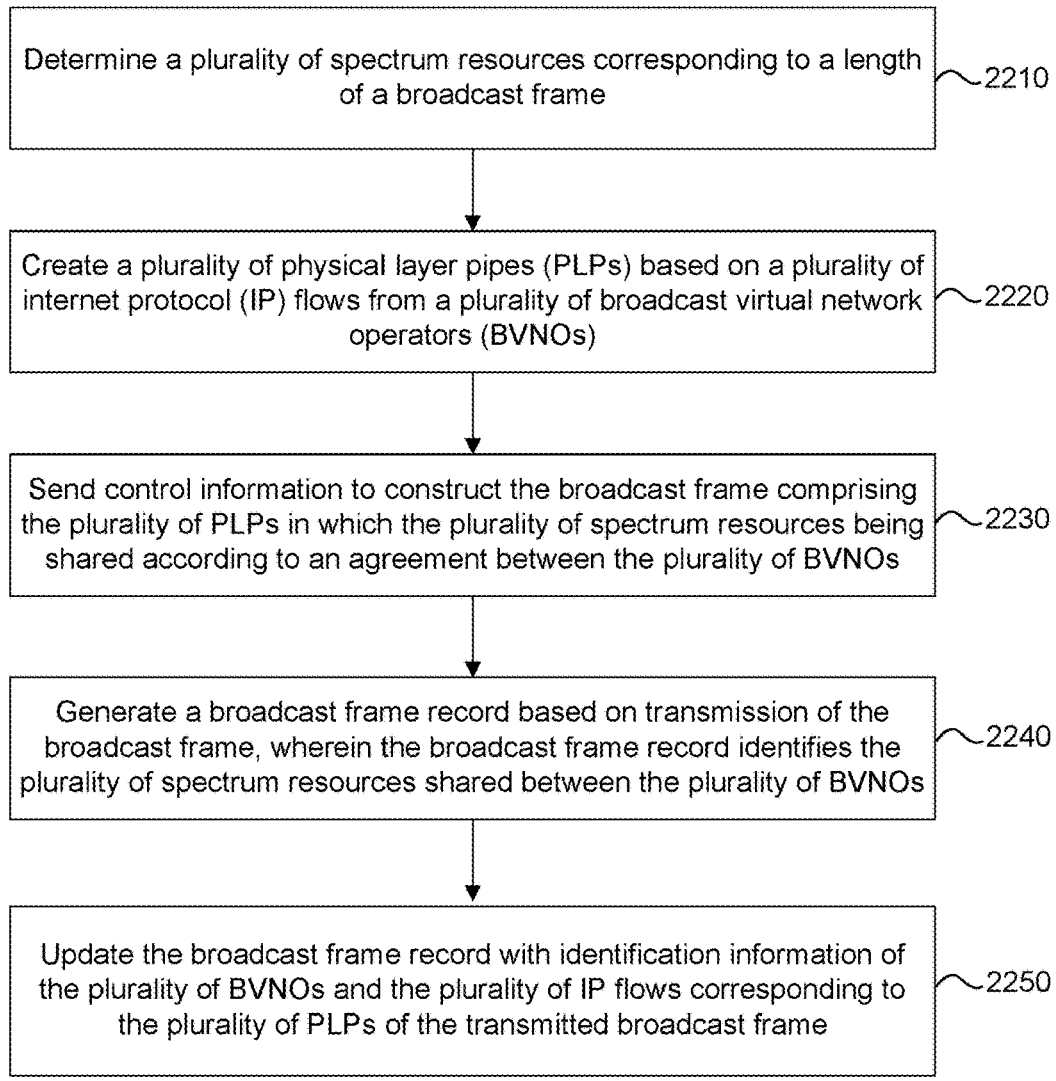
FIG. 22 illustrates a flow-chart of method steps for virtualized broadcast spectrum sharing, in accordance with some embodiments/aspects.

FIG. 22 illustrates a flow-chart of method steps for virtualized broadcast spectrum sharing, in accordance with some embodiments/aspects. It is to be appreciated not all steps may be needed, and the steps may not be performed in the same order as shown in FIG. 22. The flow-chart 2200 starts at step 2210. At step 2210, a plurality of spectrum resources corresponding to a length of a broadcast frame are determined. By way of non-limiting example, the broadcast frame can be of 250 milliseconds (ms) length, and the plurality of spectrum resources can be for a channel of 6

MHz. In some cases, more than two channels may be aggregated. Accordingly, the plurality of spectrum resources can be for aggregated channels of bandwidth 12 MHz or more.

In some embodiments/aspects, at step 2220, a plurality of physical layer pipes (PLPs) are created based on a plurality of internet protocol (IP) flows from a plurality of broadcast virtual network operators (BVNOs). Since the plurality of spectrum resources of, for example, a 6 MHz channel are shared among a plurality of BVNOs, the plurality of IP flows for data to be broadcasted using the shared spectrum resources are converted or mapped to the plurality of PLPs as described above in this disclosure.

In some embodiments/aspects, at step 2230, control information is sent to an ATSC 3.0 scheduler to construct the broadcast frame that includes the plurality of PLPs in which the plurality of spectrum resources are shared according to an agreement between the plurality of BVNOs. At step 2240, a broadcast frame record is generated based on transmission of the broadcast frame. As described above, there may be some difference between how the resources on the broadcasted frame are shared among the plurality of BVNOs and how the spectrum resources are instructed to be shared to the ATSC 3.0 scheduler. Therefore, the broadcast frame record is created identifying how the plurality of spectrum resources are shared between the plurality of BVNOs. At step 2250, the broadcast frame record is updated with identification information of the plurality of BVNOs and the plurality of IP flows corresponding to the plurality of PLPs of the transmitted broadcast frame. Accordingly, sharing of the plurality of spectrum resources according to the agreement between the plurality of BVNOs can be validated.

It is to be appreciated that embodiments/aspects of the disclosure can be implemented by a system having any combination of hardware, software, or firmware. A system can include, but is not limited to, a device having a processor and memory, including a non-transitory memory, for executing and storing instructions. A processor can include circuits configured to carry out logic and/or instructions to perform arithmetical, logical, and/or input/output (I/O) operations of the broadcast system and/or one or more components of the broadcast system. Examples of such circuits include field-programmable gate arrays (FPGAs), application-specific integrated circuits (ASICs), digital signal processors (DSPs), and general-purpose processors (GPPs). The memory can tangibly embody the data and program instructions. Software can include one or more applications and an operating system. Hardware can include, but is not limited to, a radio frequency (RF) transmitter including an RF front-end, an antenna, a processor, and a memory. The broadcast system can also have multiple processors and multiple shared or separate memory components.

Figure 23:
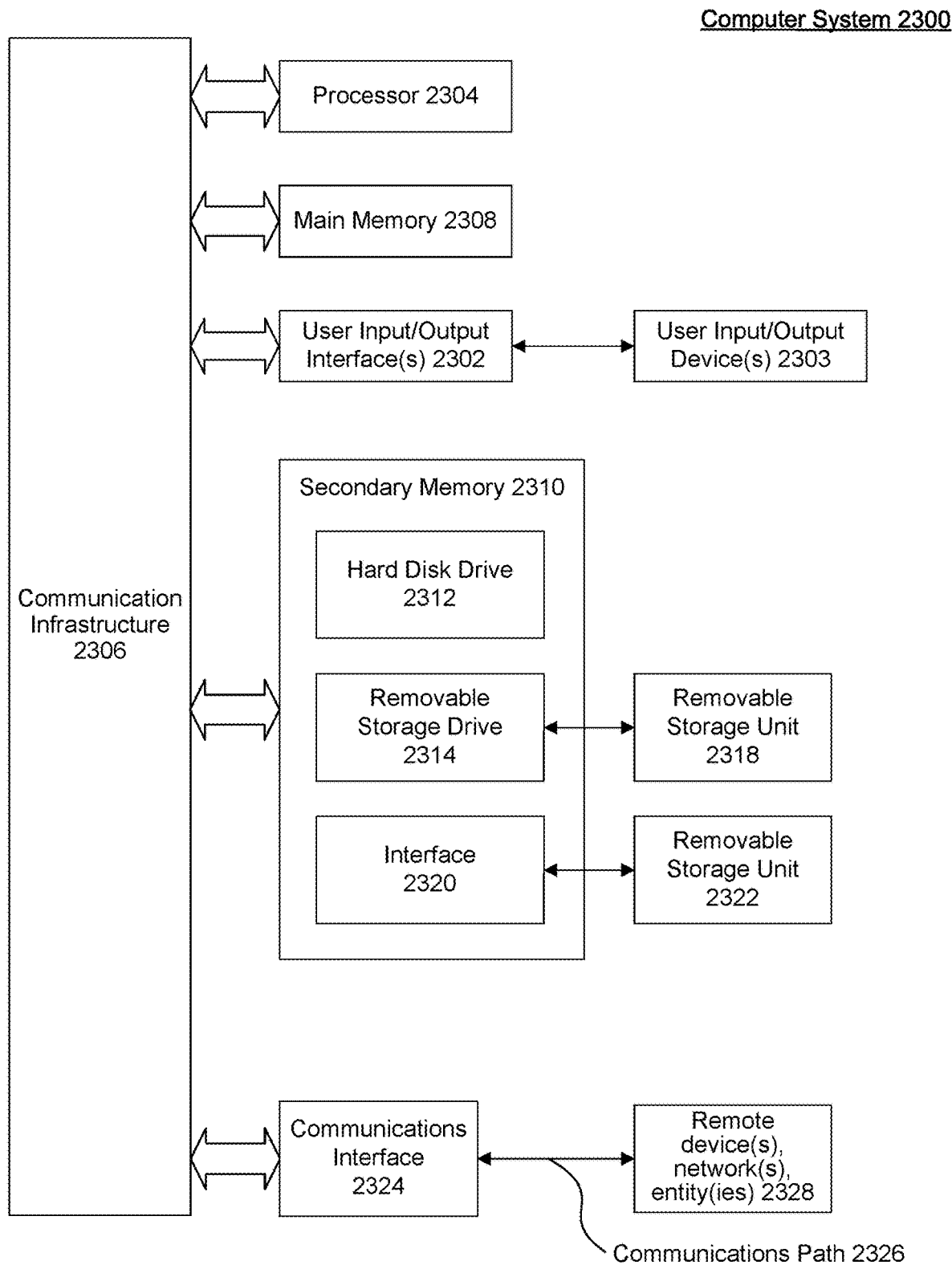
FIG. 23 illustrates a computer system that can be utilized to implement one or more embodiments/aspects as described herein.

For example, various embodiments/aspects can be implemented using one or more computer systems, such as computer system 2300 shown in FIG. 23. Computer system 2300 can be used, for example, to implement method discussed in this disclosure such as, but not limited to, method 2200 of FIG. 22. Also, one or more of systems, for example, 100, 500, etc., or part of the systems can be implemented using computer system 2300. In one example, the BMX end-to-end orchestration entity 108, the cognitive spectrum manager 110, the ATSC 3.0 exciter 105*a* through 105*h*, the SRM 103*a* through 103*d*, the ATSC 3.0 scheduler 104*a* through 104*h*, and/or the ATSC 3.0 gateway 515, etc., can be implemented using the computer system 2300. By way of non-limiting example, the computer system 2300 can be any computer capable of performing the functions described herein.

In some embodiments/aspects, the computer system 2300 includes one or more processors (also called central processing units, or CPUs), such as a processor 2304. Processor 2304 is connected to a communication infrastructure or bus 2306.

In some embodiments/aspects, the computer system 2300 also includes user input/output device(s) 2303, such as monitors, keyboards, pointing devices, etc., that communicate with communication infrastructure 2306 through user input/output interface(s) 2302.

In some embodiments/aspects, the computer system 2300 also includes a main or primary memory 2308, such as random access memory (RAM). The main memory 2308 can include one or more levels of cache. The main memory 2308 has stored therein control logic (i.e., computer software) and/or data.

In some embodiments/aspects, the computer system 2300 can also include one or more secondary storage devices or memory 2310. The secondary memory 2310 can include, for example, a hard disk drive 2312 and/or a removable storage device or drive 2314. The removable storage drive 2314 can be a solid state memory, a floppy disk drive, a magnetic tape drive, a compact disk drive, an optical storage device, tape backup device, and/or any other storage device/drive.

By way of non-limiting example, the removable storage drive 2314 can interact with a removable storage unit 2318. The removable storage unit 2318 includes a computer usable or readable storage device having stored thereon computer software (control logic) and/or data. Removable storage unit 2318 can be a floppy disk, magnetic tape, compact disk, DVD, optical storage disk, and/any other computer data storage device. The removable storage drive 2314 reads from and/or writes to the removable storage unit 2318 in a well-known manner.

In some embodiments/aspects, by way of non-limiting example, the secondary memory 2310 can include other means, instrumentalities or other approaches for allowing computer programs and/or other instructions and/or data to be accessed by the computer system 2300. Such means, instrumentalities or other approaches can include, for example, a removable storage unit 2322 and an interface 2320. Examples of the removable storage unit 2322 and the interface 2320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some embodiments/aspects, the computer system 2300 can further include a communication or network interface 2324. The communication interface 2324 enables the computer system 2300 to communicate and interact with any combination of remote devices, remote networks, remote entities, etc. (individually and collectively referenced by reference number 2328). For example, the communication interface 2324 can allow the computer system 2300 to communicate with the remote devices 2328 over communications path 2326, which can be wired and/or wireless, and which can include any combination of LANs, WANs, the Internet, etc. Control logic and/or data can be transmitted to and from the computer system 2300 via the communication path 2326.

In some embodiments/aspects, a tangible apparatus or article of manufacture comprising a tangible computer useable or readable medium having control logic (software) stored thereon is also referred to herein as a computer program product or program storage device. This includes, but is not limited to, the computer system 2300, the main memory 2308, the secondary memory 2310, and the removable storage units 2318 and 2322, as well as tangible articles of manufacture embodying any combination of the foregoing. Such control logic, when executed by one or more data processing devices (such as the computer system 2300), causes such data processing devices to operate as described herein.

Based on the teachings contained in this disclosure, it will be apparent to persons skilled in the relevant art(s) how to make and use embodiments/aspects of this disclosure using data processing devices, computer systems and/or computer architectures other than that shown in FIG. 23. In particular, embodiments/apsects can operate with software, hardware, and/or operating system implementations other than those described herein.

The disclosure is also directed to computer program products comprising software stored on any computer useable medium. Such software, when executed in one or more data processing device, causes a data processing device(s) to operate as described herein. Embodiments/aspects of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the disclosure or the appended claims in any way.

While the disclosure is made herein with reference to exemplary embodiments/aspects for exemplary fields and applications, it should be understood that the disclosure is not limited thereto. Other embodiments/aspects and modifications thereto are possible, and are within the scope and spirit of the disclosure. For example, and without limiting the generality of this paragraph, embodiments/aspects are not limited to the software, hardware, firmware, and/or entities illustrated in the figures and/or described herein. Further, embodiments/aspects (whether or not explicitly described herein) have significant utility to fields and applications beyond the examples described herein.

Embodiments/aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments/aspects may perform functional blocks, steps, operations, methods, etc. using orderings different from those described herein.

References herein to "one embodiment," "one aspects," "one embodiment/aspect," "an embodiment," "an aspect," "an embodiment/aspect," "an example embodiment," "an example aspect," "an example embodiment/aspect," or similar phrases, indicate that the embodiment or aspect described may include a particular feature, structure, or characteristic, but every embodiment or aspect may not necessarily include the particular feature, structure, or characteristic. Moreover, such phrases are not necessarily referring to the same embodiment or aspect. Further, when a particular feature, structure, or characteristic is described in connection with an embodiment or aspect, it would be within the knowledge of persons skilled in the relevant art(s) to incorporate such feature, structure, or characteristic into other embodiments or aspects whether or not explicitly mentioned or described herein.

It will be apparent to those skilled in the relevant art(s) that various changes in form and detail can be made therein without departing from the spirit and scope of the disclosure. Thus, the breadth and/or scope of the disclosure should not be limited by any of the above-described exemplary embodiments or aspects, but should be defined only in accordance with the following claims and their equivalents.

What is claimed is:

1. A method, comprising:
    determining, by a broadcast market exchange (BMX), a plurality of spectrum resources corresponding to a length of a broadcast frame;
    creating, by a scheduler, a plurality of physical layer pipes (PLPs) based on a plurality of internet protocol (IP) flows from a plurality of broadcast virtual network operators (BVNOs);
    sending, by a spectrum resource manager (SRM), control information to the scheduler to construct the broadcast frame comprising the plurality of PLPs in which the plurality of spectrum resources being shared according to an agreement between the plurality of BVNOs;
    generating, by the SRM, a broadcast frame record based on transmission of the broadcast frame, wherein the broadcast frame record identifies the plurality of spectrum resources shared between the plurality of BVNOs; and
    updating, by the SRM, the broadcast frame record with identification information of the plurality of BVNOs and the plurality of IP flows corresponding to the plurality of PLPs of the transmitted broadcast frame.

2. The method of claim 1, further comprising validating, based on the updated broadcast frame record, sharing of the plurality of spectrum resources according to the agreement between the plurality of BVNOs.

3. The method of claim 1, further comprising analyzing a plurality of orthogonal frequency division multiplexing (OFDM) symbols for identifying the plurality of spectrum resources shared between the plurality of BVNOs, wherein the plurality of OFDM symbols comprises OFDM symbols for a plurality of bootstrap symbols, one or more preamble symbols, and a plurality of data symbols.

4. The method of claim 3, wherein the analyzing the plurality of OFDM symbols comprises analyzing a first set of the plurality of OFDM symbols in time domain and analyzing a second set of the plurality of OFDM symbols in frequency domain.

5. The method of claim 1, wherein the determining the plurality of spectrum resources comprises determining the plurality of spectrum resources for a channel of 6 MHz channel bandwidth, and wherein the length of the broadcast frame is 250 milliseconds (ms).

6. The method of claim 1, further comprising aggregating two or more contiguous channels for sharing the plurality of spectrum resources according to the agreement between the plurality of BVNOs.

7. The method of claim 1, wherein the creating the plurality of physical layer pipes (PLPs) comprises using variable bit rate (VBR) encoders to broadcast data in the plurality of PLPs based on a plurality of data cells available in a PLP of the plurality of PLPs.

8. A software-defined networking (SDN) and network function virtualization (NFV) system, comprising:
a memory; and
a processor configured to perform operations stored in the memory, wherein the operations comprise:
determining, by a broadcast market exchange (BMX) of the SDN and NFV system, a plurality of spectrum resources corresponding to a length of a broadcast frame;
creating, by a scheduler of the SDN and NFV system, a plurality of physical layer pipes (PLPs) based on a plurality of internet protocol (IP) flows from a plurality of broadcast virtual network operators (BVNOs);
sending, by a spectrum resource manager (SRM) of the SDN and NFV system, control information to construct the broadcast frame comprising the plurality of PLPs in which the plurality of spectrum resources being shared according to an agreement between the plurality of BVNOs;
generating, by the SRM of the SDN and NFV system, a broadcast frame record based on transmission of the broadcast frame, wherein the broadcast frame record identifies the plurality of spectrum resources shared between the plurality of BVNOs; and
updating, by the SRM of the SDN and NFV system, the broadcast frame record with identification information of the plurality of BVNOs and the plurality of IP flows corresponding to the plurality of PLPs of the transmitted broadcast frame.

9. The SDN and NFV system of claim 8, wherein the operations further comprise validating, based on the updated broadcast frame record, sharing of the plurality of spectrum resources according to the agreement between the plurality of BVNOs.

10. The SDN and NFV system of claim 8, wherein the operations further comprise analyzing a plurality of orthogonal frequency division multiplexing (OFDM) symbols for identifying the plurality of spectrum resources shared between the plurality of BVNOs,
wherein the plurality of OFDM symbols comprises OFDM symbols for a plurality of bootstrap symbols, one or more preamble symbols, and a plurality of data symbols.

11. The SDN and NFV system of claim 10, wherein the operations further comprise analyzing a first set of the plurality of OFDM symbols in time domain and analyzing a second set of the plurality of OFDM symbols in frequency domain.

12. The SDN and NFV system of claim 8, wherein the SRM is in closed-loop feedback with variable bit rate (VBR) encoders to dynamically assign the plurality of PLPs.

13. The SDN and NFV system of claim 8, wherein the operations further comprise aggregating two or more contiguous channels for sharing the plurality of spectrum resources according to the agreement between the plurality of BVNOs.

14. The SDN and NFV system of claim 8, wherein the operations further comprise creating the plurality of physical layer pipes (PLPs) using variable bit rate (VBR) encoders to broadcast data in the plurality of PLPs based on a plurality of data cells available in a PLP of the plurality of PLPs.

15. A non-transitory computer-readable medium (CRM) comprising computer instructions, whereupon execution of the computer instructions by one or more processors of a software-defined networking (SDN) and network function virtualization (NFV) system, cause the one or more processors to:
determine, by a broadcast market exchange (BMX) of the SDN and NFV system, a plurality of spectrum resources corresponding to a length of a broadcast frame;
create, by a spectrum resource manager (SRM) of the SDN and NFV system, a plurality of physical layer pipes (PLPs) based on a plurality of internet protocol (IP) flows from a plurality of broadcast virtual network operators (BVNOs);
send, by a spectrum resource manager (SRM) of the SDN and NFV system, control information to construct the broadcast frame comprising the plurality of PLPs in which the plurality of spectrum resources being shared according to an agreement between the plurality of BVNOs;
generate, by the SRM of the SDN and NFV system, a broadcast frame record based on transmission of the broadcast frame, wherein the broadcast frame record identifies the plurality of spectrum resources shared between the plurality of BVNOs; and
update, by the SRM of the SDN and NFV system, the broadcast frame record with identification information of the plurality of BVNOs and the plurality of IP flows corresponding to the plurality of PLPs of the transmitted broadcast frame.

16. The non-transitory CRM of claim 15, wherein, upon execution, the computer instructions further cause the one or more processors to validate, based on the updated broadcast frame record, sharing of the plurality of spectrum resources according to the agreement between the plurality of BVNOs.

17. The non-transitory The CRM of claim 15, wherein, upon execution, the computer instructions further cause the one or more processors to analyze a plurality of orthogonal frequency division multiplexing (OFDM) symbols for identifying the plurality of spectrum resources shared between the plurality of BVNOs,
wherein the plurality of OFDM symbols comprises OFDM symbols for a plurality of bootstrap symbols, one or more preamble symbols, and a plurality of data symbols, and
wherein a first set of the plurality of OFDM symbols are analyzed in time domain and a second set of the plurality of OFDM symbols are analyzed in frequency domain.

18. The non-transitory The CRM of claim 15, wherein, upon execution, the computer instructions further cause the one or more processors to determine the plurality of spectrum resources for a channel of 6 MHz channel bandwidth, and wherein the length of the broadcast frame is 250 milliseconds (ms).

19. The non-transitory The CRM of claim 15, wherein, upon execution, the computer instructions further cause the one or more processors to aggregate two or more contiguous channels for sharing the plurality of spectrum resources according to the agreement between the plurality of BVNOs.

20. The non-transitory The CRM of claim 15, wherein, upon execution, the computer instructions further cause the one or more processors to create the plurality of physical layer pipes (PLPs) using variable bit rate (VBR) encoders to broadcast data in the plurality of PLPs based on a plurality of data cells available in a PLP of the plurality of PLPs.

\* \* \* \* \*